US010862603B2

(12) United States Patent
Nishimoto et al.

(10) Patent No.: US 10,862,603 B2
(45) Date of Patent: Dec. 8, 2020

(54) TRANSMISSION APPARATUS, RECEPTION APPARATUS, CONTROL STATION, COMMUNICATION SYSTEM, AND TRANSMISSION PRECODING METHOD

(71) Applicant: MITSUBISHI ELECTRIC CORPORATION, Tokyo (JP)

(72) Inventors: Hiroshi Nishimoto, Tokyo (JP); Hiroki Iura, Tokyo (JP); Akinori Taira, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 23 days.

(21) Appl. No.: 16/069,591

(22) PCT Filed: Feb. 22, 2016

(86) PCT No.: PCT/JP2016/055037
§ 371 (c)(1),
(2) Date: Jul. 12, 2018

(87) PCT Pub. No.: WO2017/145232
PCT Pub. Date: Aug. 31, 2017

(65) Prior Publication Data
US 2019/0020435 A1  Jan. 17, 2019

(51) Int. Cl.
*H04J 11/00* (2006.01)
*H04B 7/0452* (2017.01)
*H04B 7/0456* (2017.01)

(52) U.S. Cl.
CPC ........ *H04J 11/0043* (2013.01); *H04B 7/0452* (2013.01); *H04B 7/0456* (2013.01); *H04J 11/00* (2013.01); *H04J 11/003* (2013.01)

(58) Field of Classification Search
CPC ..... H04B 7/0452; H04B 7/0456; H04J 11/00; H04J 11/0043; H04J 11/003
See application file for complete search history.

(56) References Cited

U.S. PATENT DOCUMENTS

2008/0273618 A1* 11/2008 Forenza ............... H04B 7/022
375/261
2009/0052354 A1   2/2009 Wu et al.
(Continued)

FOREIGN PATENT DOCUMENTS

JP    2010-028737 A    2/2010
JP       4709209 B2    6/2011
(Continued)

OTHER PUBLICATIONS

Kim et al. "Two-Stage Beamformer Design for Massive MIMO Downlink by Trace Quotient Formulation", IEEE Transactions on Communications, vol. 63, No. 6, Jun. 2015. (Year: 2015).*
(Continued)

*Primary Examiner* — Redentor Pasia
(74) *Attorney, Agent, or Firm* — Birch, Stewart, Kolasch & Birch, LLP

(57) ABSTRACT

A base station serving as a transmission apparatus includes a plurality of transmission antennas capable of forming beams directed to a plurality of terminals, which are reception apparatus, and a precoder configured to perform outer precoding on transmission signals transmitted from the plurality of transmission antennas. The plurality of terminals include at least one first reception apparatus, which are transmission destinations of the transmission signals, and second reception apparatus, which are reception apparatus other than the first reception apparatus. The precoder performs outer precoding on the transmission signals transmitted from the plurality of transmission antennas so that received power in the second reception apparatus among the plurality of reception apparatus is equal to or less than a threshold.

20 Claims, 15 Drawing Sheets

(56) References Cited

U.S. PATENT DOCUMENTS

| | | | |
|---|---|---|---|
| 2011/0135033 A1 | 6/2011 | Ko et al. | |
| 2012/0026956 A1 | 2/2012 | Benjebbour et al. | |
| 2012/0327881 A1 | 12/2012 | Nakano et al. | |
| 2013/0259156 A1* | 10/2013 | Baligh | H04B 7/0456 375/296 |
| 2014/0185700 A1* | 7/2014 | Dong | H04B 7/0452 375/267 |
| 2015/0009851 A1* | 1/2015 | Yan | H04W 24/02 370/252 |
| 2015/0110053 A1* | 4/2015 | Zeng | H04W 72/1226 370/329 |
| 2015/0215012 A1* | 7/2015 | Yan | H04B 7/0482 375/267 |
| 2015/0244418 A1* | 8/2015 | Verbin | H04B 3/32 370/201 |
| 2015/0270882 A1* | 9/2015 | Shattil | H04B 7/0452 370/329 |
| 2016/0043783 A1* | 2/2016 | Xia | H04B 7/0456 370/329 |
| 2016/0049997 A1* | 2/2016 | Onodera | H04W 76/10 370/329 |
| 2017/0078069 A1* | 3/2017 | Jia | H04L 5/0051 |
| 2017/0257194 A1* | 9/2017 | Qiu | H04L 1/00 |
| 2018/0048268 A1* | 2/2018 | Wulich | H03F 1/3258 |
| 2019/0245596 A1* | 8/2019 | Tomeba | H04B 7/0617 |

FOREIGN PATENT DOCUMENTS

| | | |
|---|---|---|
| JP | 2011-182150 A | 9/2011 |
| JP | 2012-034053 A | 2/2012 |
| JP | 2013-46399 A | 3/2013 |
| JP | 5628973 B2 | 11/2014 |
| JP | 2014-230281 A | 12/2014 |
| KR | 10-2008-0080722 A | 9/2008 |
| WO | WO 2014/122850 A1 | 8/2014 |

OTHER PUBLICATIONS

Korean Office Action for Korean Application No. 10-2018-7023537, dated Nov. 21, 2019, with an English translation.

Japanese Office Action for Japanese Application No. 2017-102263, dated Dec. 3, 2019, with English translation.

Kim et al., "Two-Stage Beamformer Design for Massive MIMO Downlink by Trace Quotient Formulation," IEEE Transactions on Communications, vol. 63, No. 6, Jun. 2015, pp. 2200-2211 (13 pages total).

Japanese Office Action, dated Mar. 3, 2020, for Japanese Application No. 2017-102263, with an English translation.

Choi et al., "A Transmit Preprocessing Technique for Multiuser MIMO Systems Using a Decomposition Approach", IEEE Transactions on Wireless Communications, vol. 3, No. 1, Jan. 2004, pp. 20-24.

Costa, Max H. M. "Writing on Dirty Paper", IEEE Transactions on Information Theory, vol. IT-29, No. 3, May 1983, pp. 439-441.

Harashima et al., "Matched-Transmission Technique for Channels With Intersymbol Interference," IEEE Transactions on Communications, vol. COM-20, No. 4, Aug. 1972, pp. 774-780.

Hochwald et al., "A Vector-Perturbation Technique for Near-Capacity Multiantenna Multiuser Communication—Part II: Perturbation", IEEE Transactions on Communications, vol. 53, No. 3, Mar. 2005, pp. 537-544.

Mohaisen et al., "Fixed-complexity Vector Perturbation with Block Diagonalization for MU-MIMO Systems", Proceedings of the 2009 IEEE 9th Malaysia International Conference on Communications (MICC), Dec. 15-17, 2009, pp. 238-243.

Nishimoto et al., "Block Lower Multi-diagonalization for Multiuser MIMO Downlink", The Institute of Electronics, Information and Communication Engineers Technical Reports, RCS2015-101, 115(160), Jul. 2015, pp. 7-12.

Rim, Minjoong, "Multi-user downlink beamforming with multiple transmit and receive antennas", Electronics Letters, vol. 38, No. 25, Dec. 5, 2002, pp. 1725-1726.

* cited by examiner

FIG. 2

| $p \times N_w$ { $N_w$ { | | | |
|---|---|---|---|
| $H_1 B_{o1}$ | 0 | 0 | 0 |
| $H_2 B_{o1}$ | 0 | 0 | 0 |
| $H_3 B_{o1}$ | 0 | 0 | 0 |
| $H_4 B_{o1}$ | 0 | 0 | 0 |
| 0 | $H_5 B_{o2}$ | 0 | 0 |
| 0 | $H_6 B_{o2}$ | 0 | 0 |
| 0 | $H_7 B_{o2}$ | 0 | 0 |
| 0 | $H_8 B_{o2}$ | 0 | 0 |
| 0 | 0 | $H_9 B_{o3}$ | 0 |
| 0 | 0 | $H_{10} B_{o3}$ | 0 |
| 0 | 0 | $H_{11} B_{o3}$ | 0 |
| 0 | 0 | $H_{12} B_{o3}$ | 0 |
| 0 | 0 | 0 | $H_{13} B_{o4}$ |
| 0 | 0 | 0 | $H_{14} B_{o4}$ |
| 0 | 0 | 0 | $H_{15} B_{o4}$ |
| 0 | 0 | 0 | $H_{16} B_{o4}$ |

| $H_1B_{o1}B_{i1-1}$ | O | O | O |
|---|---|---|---|
| O | $H_2B_{o1}B_{i1-2}$ | O | O |
| O | O | $H_3B_{o1}B_{i1-3}$ | O |
| O | O | O | $H_4B_{o1}B_{i1-4}$ |

TRANSMISSION APPARATUS, RECEPTION APPARATUS, CONTROL STATION, COMMUNICATION SYSTEM, AND TRANSMISSION PRECODING METHOD

TECHNICAL FIELD

The present invention relates to a transmission apparatus, a reception apparatus, a control station, a communication system, and a transmission precoding method, and more particularly, to a transmission apparatus, a reception apparatus, a communication system, and a transmission precoding method in which multi-user multiple-input multiple-output (MIMO) transmission is executed.

BACKGROUND ART

As a wireless communication system accomplishing high speed transmission with limited frequency bands, a multi-user MIMO (MU-MIMO) system obtained by applying a space division multiple access (SDMA) method to an MIMO system in which a plurality of antennas are installed in each of a transmitter and a receiver has been actively studied in recent years. In the MU-MIMO system, a base station including a plurality of antennas deals with a plurality of terminals each including a plurality of antennas, and transmits signals to the plurality of terminals at the same time in the same radio frequency band.

In the MU-MIMO system, a signal from the base station is transmitted to the terminals simultaneously in downlink, namely, communication directed from the base station to the terminals. For that reason, each terminal generally receives not only a desired signal, which is a signal intended for itself, but also signals intended for other terminals. The signals intended for other terminals cause interference called inter-user interference (IUI). IUI is a problem unique to MU-MIMO. A countermeasure against IUI is taken desirably on the base station side in which, compared to the terminals, the processing amount is smaller and there are fewer restrictions related to the number of antennas. The base station accordingly executes processing called precoding as an IUI countermeasure in downlink in the MU-MIMO system. Precoding means processing of forming a beam by weighting a plurality of signals transmitted from a plurality of antennas.

Block diagonalization (BD) has been studied widely as a typical precoding method executed as an IUI counter measure in downlink in the MU-MIMO system. See Non-Patent Literature 1 and Non-Patent Literature 2, for example. BD is a precoding method in which a beam space is formed so as to have a directivity that steers a null to directions other than the direction of a desired terminal, that is, that sets the received power to 0 in terminals other than the desired terminal. An MU-MIMO system free of IUI is realized by applying BD to all terminals. This simplifies processing on the terminals and the apparatus configuration.

Meanwhile, non-linear precoding (NLP), typically Tomlinson-Harashima Precoding (THP) and Vector Perturbation (VP), and block multiplex diagonalization, which is linear precoding higher in potential than BD, are reported as precoding methods with which higher performance than in BD is accomplished. For THP, see Non-Patent Literature 3 and Non-Patent Literature 4, for example. For VP, see Non-Patent Literature 5. For block multiplex diagonalization, see Non-Patent Literature 6. NLP is a method in which an IUI occurring in a reception terminal is subtracted in advance on the transmission base station side and, although the computational load is heavier than in BD, excellent characteristics are obtained. According to Non-Patent Literature 6, block multiplex diagonalization requires an IUI countermeasure and, when applied in combination with NLP, yields excellent performance.

CITATION LIST

Non Patent Literature

[NPL 1] M. Rim, "Multi-user downlink beamforming with multiple transmit and receive antennas", Electron. Lett., vol. 38, no. 25, pp. 1725-1726, December 2002.

[NPL 2] L. U. Choi and R. D. Murch, "A transmit preprocessing technique for multiuser MIMO systems using a decomposition approach", IEEE Trans, Wireless Commun., vol. 3, no. 1, pp. 20-24, January 2004.

[NPL 3] M. Costa, "Writing on dirty paper", IEEE Trans. Inf. Theory, vol. 29, no. 3, pp. 439-441, May 1983.

[NPL 4] H. Harashima and H. Miyakawa, "Matched-transmission technique for channels with intersymbol interference", IEEE Trans. Commun., vol. 20, August 1972.

[NPL 5] B. M. Hochwald, C. B. Peel, and A. L. Swindlehurst, "A vector-perturbation technique for near-capacity multiantenna multiuser communication-Part II: Perturbation", IEEE Trans. Commun., vol. 53, no. 3, pp. 537-544, March 2005.

[NPL 6] Hiroshi Nishimoto, Akinori Taira, Akihiro Okazaki, and Atsushi Okamura, "Block Lower Multi-diagonalization for Multiuser MIMO Downlink", IEICE Technical Report, R C S 2015-101, 115 (160), pp. 7-12, July 2015.

SUMMARY OF INVENTION

Technical Problem

NLP is used as a precoding method with which higher performance than in BD is accomplished as described above. However, NLP in which the computational load required for the IUI subtraction on the base station side increases in proportion to the square of the number of users has a problem in that the apparatus scale is large when the number of users is large. A large number of users also give rise to another problem in that scheduling is complicated, irrespective of what precoding method is used in MU-MIMO.

The present invention has been made to solve those problems, and an object of the present invention is to provide a transmission apparatus, a reception apparatus, a control station, a communication system, and a transmission precoding method in which an IUI countermeasure can be taken with ease even when there are a large number of users.

Solution to Problem

According to one embodiment of the present invention, there is provided a transmission apparatus including: a plurality of transmission antennas capable of forming beams directed to a plurality of reception apparatus; and an outer precoder configured to perform outer precoding on transmission signals transmitted from the plurality of transmission antennas, wherein the plurality of reception apparatus include: one or more first reception apparatus, which are transmission destinations of the transmission signals; and second reception apparatus, which are reception apparatus other than the one or more first reception apparatus, and wherein the outer precoder is configured to perform the outer precoding on the transmission signals transmitted from the plurality of transmission antennas so that received power in the second reception apparatus out of the plurality of reception apparatus is equal to or less than a threshold.

Advantageous Effects of Invention

According to the present invention, transmission precoding obtained by BD is performed with respect to user clusters in MU-MIMO downlink, to thereby separate a plurality of user clusters spatially and orthogonally, and break down the whole MU-MIMO downlink into small-scale MU-MIMO downlink matter on a user cluster-by-user cluster basis. An excellent effect is consequently obtained in that an IUI countermeasure can be taken with ease even when the number of users is large.

BRIEF DESCRIPTION OF DRAWINGS

FIG. 2 is a diagram for illustrating user clustering, which is a principle of the present invention.

FIG. 3 is a diagram for how an IUI in a cluster is solved when user clustering, which is the principle of the present invention, is executed.

FIG. 4 is a diagram for illustrating the principle of the present invention.

DESCRIPTION OF EMBODIMENTS

A transmission apparatus, communication system, and transmission precoding method according to embodiments of the present invention are described in detail below with reference to the drawings. The embodiments are not to limit the present invention.

First Embodiment

Figure 1:
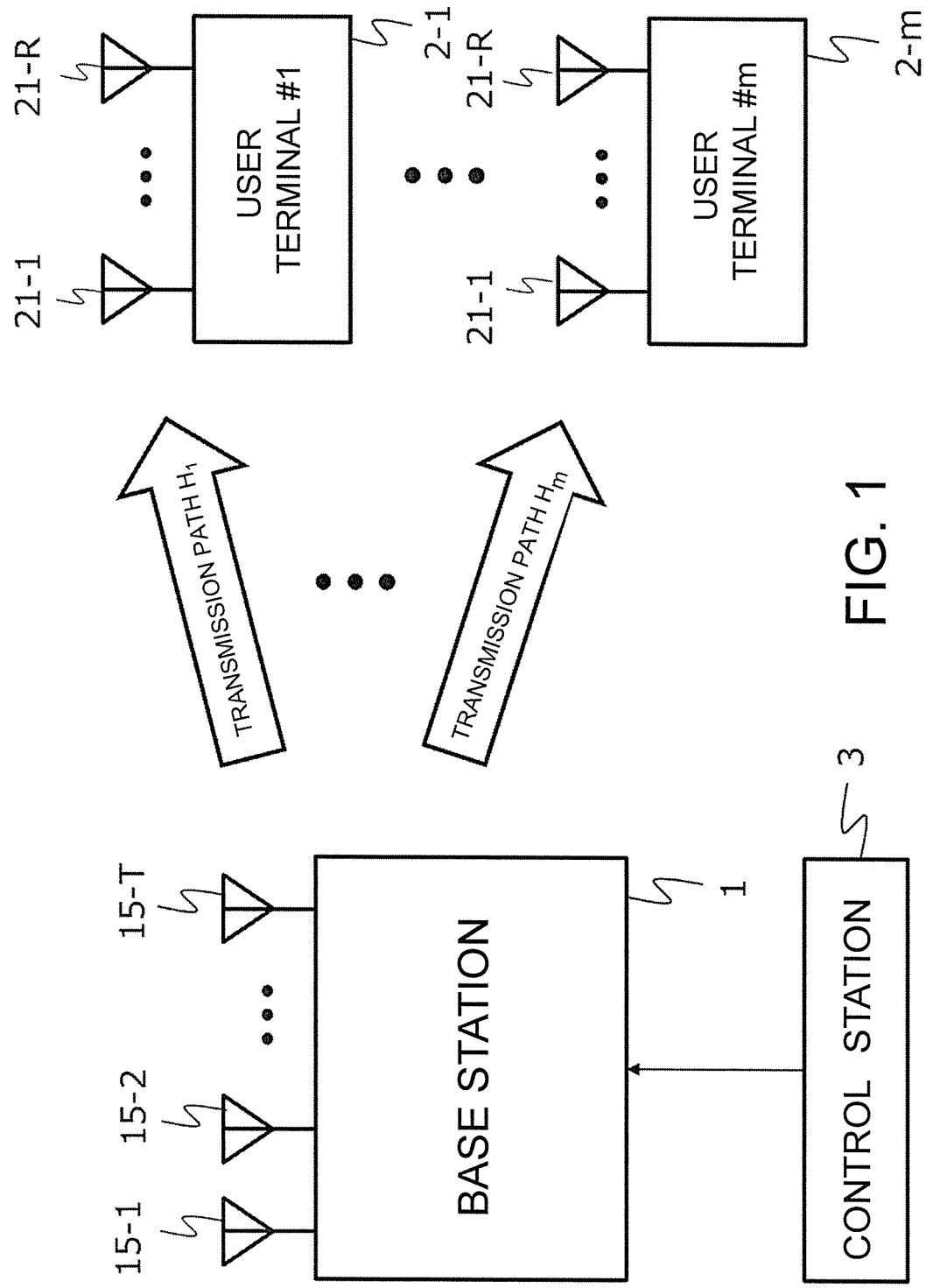
FIG. 1 is a diagram for illustrating an MU-MIMO system to which the present invention is applied.

FIG. 1 is a diagram for illustrating a configuration example of a communication system according to a first embodiment of the present invention. As illustrated in FIG. 1, the communication system according to the first embodiment includes a base station 1, a plurality of terminals 2-1 to 2-$m$, and a control station 3. The terminals 2-1 to 2-$m$ are user terminals. The symbol m represents an integer equal to or more than 2. In the following description, the terminals 2-1 to 2-$m$ may also be referred to as "users". The terminals 2-1 to 2-$m$ are referred to as "terminals 2" when one does not need to be distinguished from another. The base station 1 includes a plurality of antennas 15-1 to 15-T. The terminals 2-1 to 2-$m$ each include one or more antennas 21. The terminals 2 and the base station 1 hold two-way communication by wireless communication. The control station 3 is connected to the base station 1. The control station 3 conducts scheduling in which m terminals to be communication targets are selected out of more than m communication candidate terminals. The following description on the embodiments of the present invention takes as an example a case in which the control station 3 conducts scheduling to select the terminals 2-1 to 2-$m$ as communication targets, and information about the selection is notified to the base station 1. The control station 3 and the base station 1 are connected by a communication line, but may hold wireless communication.

Downlink communication is described in the first embodiment. Downlink communication means communication from the base station 1 to the terminals 2. The base station 1 is accordingly a transmission apparatus while the terminals 2 serve as reception apparatus. The communication system according to the first embodiment uses MU-MIMO for downlink communication, and the base station 1 can form a transmission beam having directivity toward the plurality of terminals 2 by performing precoding with respect to transmission signals that are transmitted from a plurality of antennas. The base station 1 and the terminals 2 may hold communication in which the terminals 2 are transmission apparatus and the base station 1 serves as a reception apparatus, in short, uplink communication. Any communication method may be used in uplink communication.

Terms in the first embodiment are described first. In the following description, physical transmission antennas and reception antennas are referred to as "antennas", and an alignment of a plurality of antennas included in one apparatus, namely, an antenna group, is referred to as "array". An alignment of a plurality of signals corresponding to an array may also be simply referred to as "array" for the sake of convenience. An alignment of a plurality of transmission antennas is referred to as "transmission array", and an alignment of a plurality of reception antennas is referred to as "reception array". The number of effective antennas observed when the product of multiplication by a weight matrix, which is a matrix indicating a weight to be applied to a transmission array or a reception array, is calculated is referred to as "branch". The number of reception branches, which are branches on the reception side, is the number of pieces of data transmitted in parallel to each of the terminals 2, which are reception apparatus, and is the number of rows in a reception weight matrix, by which an array is multiplied to calculate the product in the terminal 2. The number of transmission branches, which are branches on the transmission side, is the number of columns in a transmission weight matrix, by which an array is multiplied in the base station 1 operating as a transmission apparatus, that is, the number of columns of transmission precoding.

There is no restriction on the number of antennas 21 included in the terminals 2, and the present invention is applicable also to the case in which the number of antennas varies from one terminal 2 to another and the case in which the number of reception branches varies from one terminal 2 to another. However, R (R is an integer equal to or more than 1) antennas are included in whichever terminal 2 in the following description for the purpose of simplifying the description. Another premise of the following description is that a reception array is multiplied by $N_w$ ($N_w \leq R$) weight matrices in each of the terminals 2. The number of reception branches per terminal 2 observed from the base station 1, which is a transmission apparatus, is accordingly $N_w$ for whichever terminal 2. A total reception branch count $N_{w,total}$, which is the number of branches of all terminals, is thus expressed as $N_{w,total} = \Sigma_{k-1}^{m}(N_w) = m \times N_w$. A weight applied to a reception array is a weight assumed in the calculation of a precoding matrix, and can be any weight. For instance, a weight applied when $N_w = R$ is established may be a unit matrix, or an eigenvector matrix of a transmission path matrix, and any matrix can be used as a reception weight matrix. In the following description, an antenna count T of the base station 1 and the reception branch count $N_w$ of each of the terminals 2 satisfy a relationship $T \geq N_{w,total} = m \times N_w$.

It is assumed in the first embodiment that m terminals 2 in total are divided into C (C≤m) groups (hereinafter referred to as "user clusters" or simply "clusters"). In the following description of the first embodiment, the number of terminals included in a user cluster is the same for every user cluster for a simpler description, and the number of terminals 2 included in a user cluster is denoted by p. In other words, m=p×C is satisfied. However, the number of terminals included in a user cluster is not limited thereto, and may vary from one user cluster to another.

Next, downlink communication in the communication system according to the first embodiment, which employs MU-MIMO, is modeled into a mathematical expression. The transmission signal vector of a transmission signal transmitted to the terminal 2-$i$ ($i=1, \ldots, m$) is given as $s_i(t)$, a transmission power distribution matrix, which is a matrix indicating power distribution to the terminal 2-$i$, is given as $P_i$, and a precoding matrix, namely, a beam forming matrix, corresponding to the terminal 2-$i$ is given as $B_i$. A true transmission path matrix related to a transmission path from an antenna of the base station 1 to the antenna 21 of the terminal 2-$i$ and having R rows and T columns is given as $\hat{H}_i$, a reception weight matrix applied in the terminal 2-$i$ and having $N_w$ rows and R columns is given as $W_i$, and a true reception signal vector of the terminal 2-$i$ before multiplication by a reception weight is performed to calculate the product is given as $y_i(t)$. A reception signal vector of the terminal 2-$i$ after multiplication by the reception weight is performed to calculate the product is given as $r_i(t)$, and a true reception thermal noise vector in a transmission path from one of the antennas 15 of the base station 1 to the antenna 21 of the terminal 2-$i$ is given as $\hat{n}_i(t)$. In this case, a system model obtained by modeling the communication system according to the first embodiment into a mathematical expression can be defined by Expression (1).

$$\begin{bmatrix} r_1(t) \\ \vdots \\ r_m(t) \end{bmatrix} = \begin{bmatrix} W_1 & \cdots & o \\ \vdots & \ddots & \vdots \\ o & \cdots & W_m \end{bmatrix} \begin{bmatrix} y_1(t) \\ \vdots \\ y_m(t) \end{bmatrix} = \begin{bmatrix} W_1 & \cdots & o \\ \vdots & \ddots & \vdots \\ o & \cdots & W_m \end{bmatrix} \quad (1)$$

$$\left( \begin{bmatrix} \hat{H}_1 \\ \vdots \\ \hat{H}_m \end{bmatrix} [B_1 \ldots B_m] \begin{bmatrix} \sqrt{P_1} & \cdots & o \\ \vdots & \ddots & \vdots \\ o & \cdots & \sqrt{P_m} \end{bmatrix} \begin{bmatrix} s_1(t) \\ \vdots \\ s_m(t) \end{bmatrix} + \begin{bmatrix} \hat{n}_1(t) \\ \vdots \\ \hat{n}_m(t) \end{bmatrix} \right)$$

A matrix that is the product of multiplication of the reception weight matrix $W_i$ and the true transmission path matrix $\hat{H}_i$ and that has $N_w$ rows and T columns is given as a new transmission path matrix $H_i$, and a $N_w$-th order vector, which is the product of multiplication of the true reception thermal noise vector $\hat{n}_i(t)$ and the reception weight matrix $W_i$, is given as a new reception thermal noise vector $n_i(t)$. Then, the system model can be expressed by Expression (2).

$$\begin{bmatrix} r_1(t) \\ \vdots \\ r_m(t) \end{bmatrix} = \begin{bmatrix} H_1 \\ \vdots \\ H_m \end{bmatrix} [B_1 \ldots B_m] \begin{bmatrix} \sqrt{P_1} & \cdots & o \\ \vdots & \ddots & \vdots \\ o & \cdots & \sqrt{P_m} \end{bmatrix} \begin{bmatrix} s_1(t) \\ \vdots \\ s_m(t) \end{bmatrix} + \begin{bmatrix} n_1(t) \\ \vdots \\ n_m(t) \end{bmatrix} \quad (2)$$

Expression (2) can be expressed as Expression (3).

$$\bar{r}(t) = \overline{HBP}\bar{s}(t) + \bar{n}(t) \quad (3)$$

In Expression (3), $\overline{H}$ represents a system transmission path matrix indicating transmission paths from antennas of the base station 1 to all branches of all terminals 2 after the products of multiplication by reception weights are calculated and having $N_{W,total}$ rows and T columns, and $\overline{B}$ represents a system precoding matrix used by the base station 1 with respect to all terminals 2 and having T rows and $N_{st}$ columns. The symbol $\overline{P}$ represents a system transmission power matrix, which is a matrix defining transmission power distribution to all terminals 2, $\bar{s}(t)$ represents an $N_{st}$-th order system transmission vector indicating a transmission signal to all terminals 2, and $\bar{n}(t)$ represents an $N_{W,total}$-th order system noise vector, which is a noise vector of noise applied to all terminals 2 after the products of multiplication by reception weights are calculated. The product of $\overline{H}$ and $\overline{B}$ can be regarded as an effective system transmission path matrix $\overline{H}_e$ of a path formed by transmission beam forming as shown in Expression (4).

$$\overline{H}_e = \begin{bmatrix} H_1 B_1 & H_1 B_2 & \cdots & H_1 B_m \\ H_2 B_1 & H_2 B_2 & \cdots & H_2 B_m \\ \vdots & \vdots & \ddots & \vdots \\ H_m B_1 & H_m B_2 & \cdots & H_m B_m \end{bmatrix} \quad (4)$$

In the effective system transmission path matrix $\overline{H}_e$ expressed by Expression (4), only a diagonal block term, namely, $H_i B_i$ components are left and an off-diagonal block term, which means components other than $H_i B_i$ components, form a zero matrix O to create a precoding matrix. A precoding method using this precoding matrix is BD. BD is a precoding method in which a beam space is formed so as to have a directivity that steers a null to terminals other than one or more transmission destination terminals operating as transmission destinations of a transmission signal, namely, a directivity that makes received power in the other terminals equal to or less than a threshold. This makes received power in the transmission signal destination terminal (s) greater than the threshold and the received power in the other terminals equal to or less than the threshold. In the first embodiment, a user cluster created by grouping a plurality of users is handled as a pseudo-user, and BD is applied to a pseudo-user as described in detail below. This eliminates interference between pseudo-users, namely, inter-user cluster interference (IUCI), and allows the whole MU-MIMO downlink to be segmented into small-scale MU-MIMO downlink matter within respective user clusters.

Outer precoding processing executed in the first embodiment is described next. In OFDM or single-carrier block transmission, the precoding processing described below may be executed for each discrete frequency independently, or may be executed for the entire band at once instead of on a frequency-by-frequency basis.

In the process of calculating an outer precoding matrix described below, information about a transmission path matrix of a path in the downlink direction, namely, transmission path information is required. How a precoder obtains a transmission path matrix is not particularly limited. However, transmission path information estimated in the relevant terminal 2 and received from the terminal 2 is used in the case of, for example, a communication system employing frequency division duplex (FDD), which uses different frequencies for downlink communication and uplink communication. In the case of a communication system in which time division duplex (TDD) is used in downlink and uplink, reversibility between transmission and reception can be utilized. In this case, a transmission path in the uplink direction is estimated based on a signal received from the relevant terminal 2, and the estimated transmission path can be used as downlink transmission path information. The estimation of a transmission path can adopt any method as described above, and an estimation method using a pilot signal can be used, for example.

The description takes as an example an image of an effective system transmission path matrix obtained when the number of the terminals 2 "m" is 16 (m=16), the number of the reception branches of each terminal 2 "$N_w$" is 2 ($N_w$=2), the number of the transmission antennas of the base station 1 "T" is 32 (T=2), the number of the user clusters "C" is 4 (C=4), and the number of intra-cluster terminals "p" is 4 (p=4). The terminals 2 are grouped so that the terminals 2-1 to 2-4 form Cluster 1, while the terminals 2-5 to 2-8 form Cluster 2, the terminals 2-9 to 2-12 form Cluster 3, and the terminals 2-13 to 2-16 form Cluster 4. Cluster 1 to Cluster 4 are handled as Pseudo-user 1 to Pseudo-user 4, respectively, and BD is applied to Pseudo-user 1 to Pseudo-user 4. This makes received power in the terminals 2 included in clusters that are transmission destinations of a transmission signal greater than a threshold, and received power in the terminals 2 included in other clusters equal to or less than the threshold. The number of the reception branches of each pseudo-user is calculated by p×$N_w$ as 8, and obtained precoding matrices of the respective Psuedo-users 1 to 4 are accordingly matrices each having 32 rows and 8 columns. The obtained precoding matrices are referred to as "outer precoding matrices". When an outer precoding matrix corresponding to a cluster j is given as $B_{oj}$, an effective system transmission path matrix obtained by multiplying the system transmission path matrix and outer precoding matrices is as illustrated in FIG. 2. In short, IUCI can be suppressed.

While spatial intersection between user clusters is accomplished by outer precoding, IUI within a user cluster still remains. Cluster 1 is taken here as an example. Cluster 1 includes the terminals 2-1, 2-2, 2-3, and 2-4, which correspond to effective transmission path matrices $H_1B_{o1}$, $H_2B_{o1}$, $H_3B_{o1}$, and $H_4B_{o1}$, respectively. The effective transmission path matrices are regarded as new transmission path matrices, and inner precoding for solving IUI among the four users is executed with the use of the new transmission path matrices. Precoding technologies for MU-MIMO that have been disclosed can be applied to the inner precoding, and applicable technologies include linear precoding, typically BD, and NLP, typically THP and VP. A different inner precoding method may be applied to each user cluster. Here, a case in which BD is applied as the inner precoding is taken as an example for the purpose of simplification. When inner precoding matrices calculated by BD for the terminals 2-1 to 2-4 and each having 8 rows and 2 columns are given as $B_{i1\text{-}1}$ to $B_{i1\text{-}4}$, respectively, an effective transmission path matrix to which outer precoding and inner precoding are applied is as illustrated in FIG. 3. Specifically, effective transmission path matrices corresponding to the terminals 2-1, 2-2, 2-3, and 2-4 are $H_1B_{o1}B_{i1\text{-}1}$, $H_2B_{o1}B_{i1\text{-}2}$, $H_3B_{o1}B_{i1\text{-}3}$, and $H_4B_{o1}B_{i1\text{-}4}$, respectively. IUI within a user cluster can be suppressed in this manner.

Figure 4:
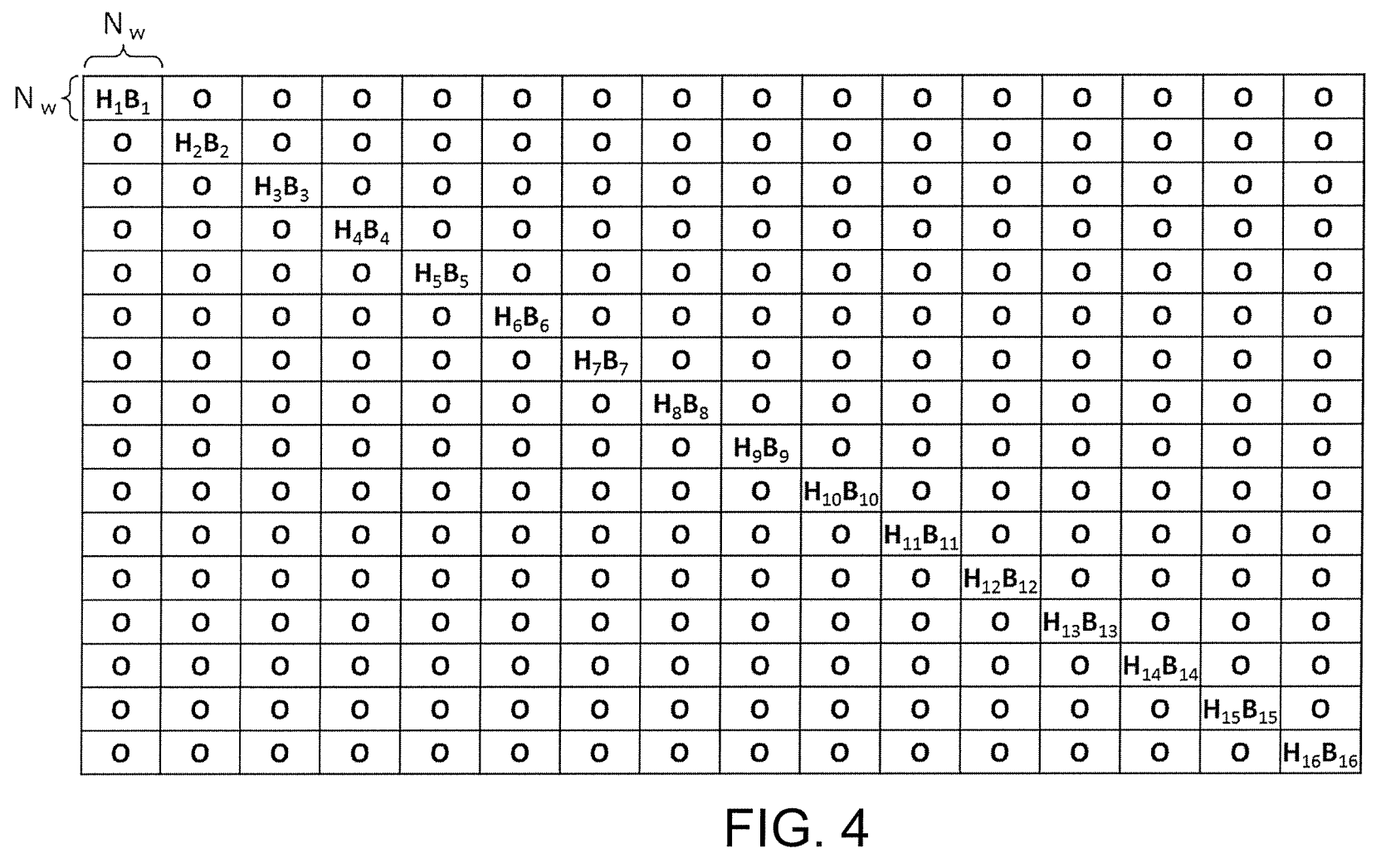

When the inner precoding described above is applied to User Clusters 2, 3, and 4 as well, an MU-MIMO environment in which all terminals 2 spatially intersect as illustrated in FIG. 4 is accomplished as a result. The precoding matrix for the terminal 2-1 is $B_1=B_{o1}B_{i1\text{-}1}$, the precoding matrix for the terminal 2-2 is $B_2=B_{o1}B_{i1\text{-}2}$, the precoding matrix for the terminal 2-3 is $B_3=B_{o1}B_{i1\text{-}3}$, and the precoding matrix for the terminal 2-4 is $B_4=B_{o1}B_{i1\text{-}4}$. A precoding matrix for the terminal 2-5, which is included in User Cluster 2, is $B_5=B_{o2}B_{i2\text{-}1}$, and a precoding matrix for the terminal 2-6 is similarly $B_6=B_{o2}B_{i2\text{-}2}$. In this manner, outer precoding matrices and inner precoding matrices are integrated into one in FIG. 4. The system precoding matrix $\bar{B}$ in the example described above is a matrix having T rows and (m×$N_w$) rows and aligning $B_1$ to $B_{16}$ in the column direction. BD is used also for inner precoding in the example described above and, consequently, the same environment as when BD is applied to the entire MU-MIMO system is accomplished.

This concludes the description on the principle of a transmission precoding method of embodiments of the present invention. The present invention involves suppression of IUCI through application of BD on a user cluster-by-user cluster basis as outer precoding. The description given above begins with outer precoding and then moves on to inner precoding for the convenience of describing the process of dividing an effective transmission path space. In actual steps of transmission signal processing, however, inner precoding is executed first and outer precoding is executed next. The description given above also omits the system transmission power matrix $\bar{P}$, which defines transmission power distribution, in order to simplify the description. However, the power distribution may be applied to signals directed to the terminals 2 for which precoding is executed, or may be included in an inner precoding matrix and an outer precoding matrix. While BD, namely, linear precoding, is used as inner precoding in the example described above, the present invention is not limited thereto, and NLP, typically THP and VP, may also be applied as inner precoding when a matrix obtained by multiplying a transmission path matrix and an outer precoding matrix is regarded as a new transmission path matrix.

Figure 5:
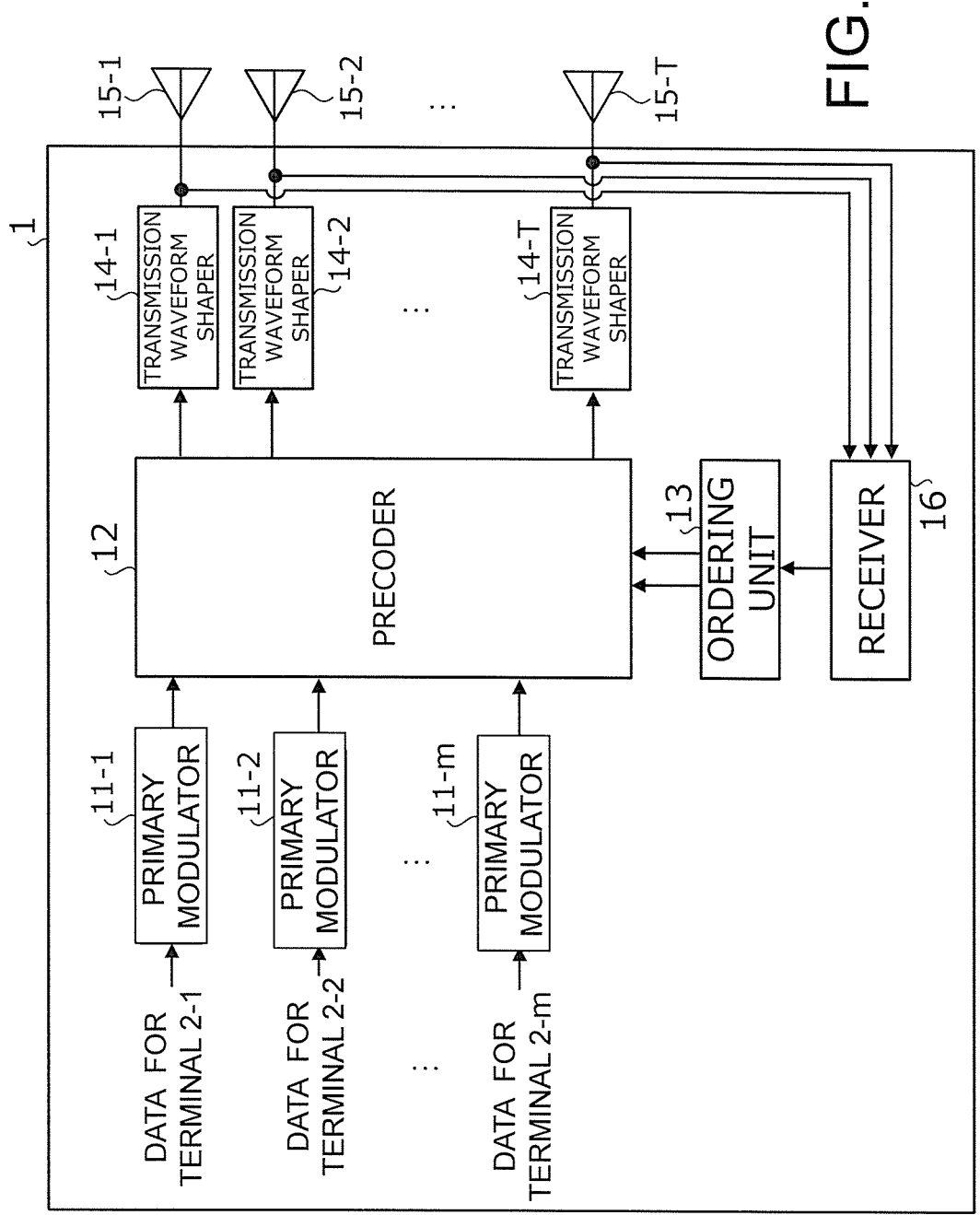
FIG. 5 is a diagram for illustrating an example of the configuration of abase station in a first embodiment of the present invention.

A specific configuration example is used next to describe the first embodiment. FIG. 5 is a diagram for illustrating a configuration example of the base station 1 of the first embodiment. The base station 1 includes primary modulators 11-1 to 11-m, a precoder 12, an ordering unit 13, transmission waveform shapers 14-1 to 14-T, the antennas 15-1 to 15-T, and a receiver 16. The base station 1 is provided with at least as many primary modulators 11 as the number of terminals 2, and each of the primary modulators 11 is denoted by 11-$i$ ($i$=1, ..., m). Each primary modulator 11-$i$ performs primary modulation with respect to a transmission signal to be transmitted to each terminal 2-$i$, and outputs the primarily modulated transmission signal to the precoder 12. Examples of primary modulation performed by the primary modulator 11-$i$ include channel coding and the mapping into primary modulation symbols such as a Quadrature Amplitude Modulation (QAM) symbol. In the case of using a single-carrier block transmission method, primary modulation performed by the primary modulator 11-$i$ includes discrete Fourier transform processing. The primary modulators 11-1 to 11-$m$ are signal generators configured to generate, for each terminal 2, which is a reception apparatus, transmission signals to be transmitted to the terminal 2.

The precoder 12 performs user clustering with respect to transmission signals generated by the primary modulators 11-1 to 11-$m$. That is, the precoder 12 sorts and groups the signals, and then performs inner precoding on a user cluster-by-user cluster basis. The precoder 12 then performs outer precoding with respect to signals of all user clusters, and outputs a signal, in which all precoded transmission signals are multiplexed, to the transmission waveform shapers 14-1 to 14-T.

Figure 6:
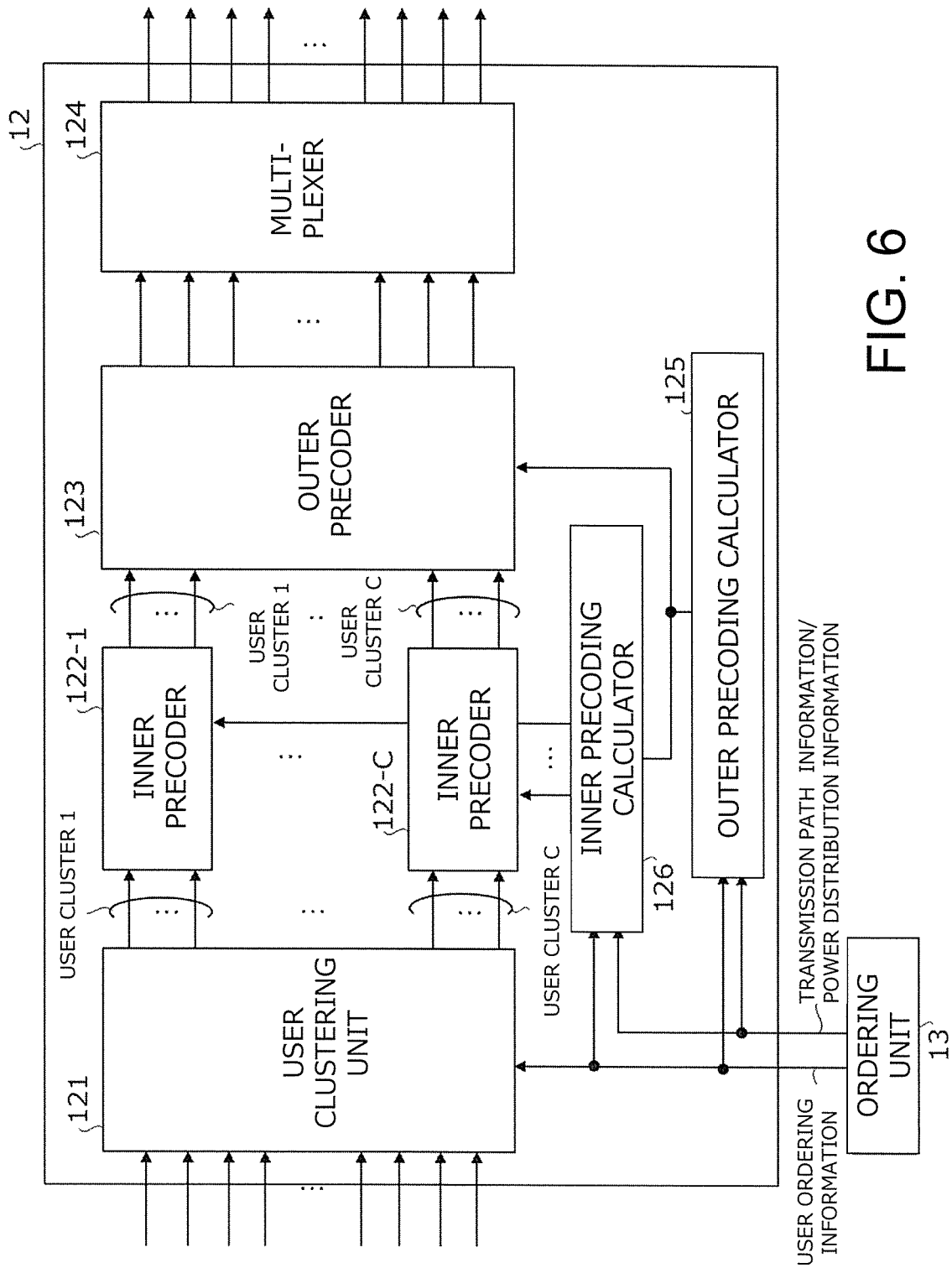
FIG. 6 is a diagram for illustrating an example of the configuration of a precoder in the first embodiment of the present invention.

FIG. 6 is a diagram for illustrating the internal configuration of the precoder 12. The precoder 12 includes a user clustering unit 121, inner precoders 122-1 to 122-C, an outer precoder 123, a multiplexer 124, an outer precoding calculator 125, and an inner precoding calculator 126.

Specific descriptions are given on those components.

The user clustering unit 121 changes the order of the user signals primarily modulated and output from the primary modulators 11-1 to 11-$m$, according to user ordering information, which is determined by the ordering unit 13, and outputs the re-ordered signals to the inner precoders 122-1 to 122-C. When the re-ordered transmission signals are given as s121-1-1, s121-1-2, ..., s121-1-$p$, s121-2-1, s121-2-2, ..., s121-2-$p$, ..., s121-C-1, s121-C-2, ..., s121-C-p, p sorted transmission signals are allocated to each of User Cluster 1, User Cluster 2, ..., and User Cluster C in order, and the signals of User Cluster j ($j$=1, ..., C) are output to the inner precoder 122-$j$, respectively, and p represents an integer equal to or more than 1.

Groups of signals of Pseudo-users 1 to C are input to the inner precoders 122-1 to 122-C, respectively, that is, signals of p terminals are input to each of the inner precoders 122-1 to 122-C, which then execute processing of solving IUI among terminals. While orthogonal transformation among user clusters is accomplished by the outer precoder 123, which is downstream of the inner precoders 122 and described later, IUI within a user cluster remains. This problem can be solved by applying precoding technologies for MU-MIMO that have been disclosed, and applicable technologies include, for example, linear precoding such as BD, and NLP such as THP and VP. The inner precoders 122-1 to 122-C use one of these methods as inner precoding, and apply the method to the input signals. Information about an effective transmission path matrix, which is necessary for the inner precoding and to which outer precoding is assumed to be applied, and information about an inner precoding matrix necessary for the inner precoding are supplied from the inner precoding calculator 126. The signals in which IUI is now solved are output to the outer precoder 123.

The outer precoder 123 multiplies, by an outer precoding matrix, each group of p pseudo-user signals input to the outer precoder 123. Information about the outer precoding matrix is supplied from the outer precoding calculator 125. The signals in which IUCI is now solved by applying the outer precoding are output to the multiplexer 124.

The multiplexer 124 adds all the signals of m (=p×C) terminals to which inner precoding and outer precoding have been applied and which are input to the multiplexer 124, and outputs the sum to the transmission waveform shapers 14-1 to 14-T.

The outer precoding calculator 125 calculates outer precoding matrices by applying BD to C pseudo-users, namely, C user clusters. Base station-terminal transmission path information with respect to m terminals, power distribution information, and user ordering information, which are used for the calculation, are supplied from the ordering unit 13. Transmission paths of the respective pseudo-users are handled as a matrix having (p×$N_w$) rows and T columns in the calculation based on BD. The application of BD to pseudo-users suppresses IUCI among pseudo-users, namely, user clusters, and a space in which the C user clusters are orthogonal to one another can be formed. Information about the calculated outer precoding matrices is input to the outer precoder 123.

The inner precoding calculator 126 calculates inner precoding matrices for solving IUI within each user cluster. The calculation uses information about outer precoding matrices of the respective user clusters, which is supplied from the outer precoding calculator 125, and uses base station-terminal transmission path information, power distribution information, and user ordering information, which are supplied from the ordering unit 13. The inner precoding calculator 126 calculates inner precoding matrices for the respective user clusters by applying one of MU-MIMO precoding technologies. Information about the calculated inner precoding matrices is input to the inner precoders 122-1 to 122-C. The inner precoders 122-1 to 122-C execute inner precoding with the use of the calculated matrices, thereby solving IUI among p terminals within each user cluster.

The ordering unit 13 determines the order of the terminals 2 in precoding, the configuration of C user clusters (i.e., determines, for each user cluster, which terminals are included in the user cluster), and power distribution to the terminals 2, and instructs the precoder 12 to use the determined order, cluster configuration, and power distribution. The ordering unit 13 also supplies base station-terminal transmission path matrix information with respect to each terminal 2 to the precoder 12.

The transmission waveform shapers 14-1 to 14-T each perform secondary modulation, digital-to-analog (D/A) conversion, conversion from a baseband frequency to a radio frequency, and the like with respect to signals precoded by the precoder 12, and transmit the processed signals via the antennas 15-1 to 15-T, respectively. The secondary modulation is multi-carrier modulation when Orthogonal Frequency Division Multiplex (OFDM) or other multi-carrier methods are used, and is single-carrier modulation when single-carrier block transmission or other single-carrier methods are used. The method of modulation is not particularly limited in the secondary modulation, and modulation methods other than OFDM and single-carrier block transmission described above may be performed. When block transmission such as OFDM or single-carrier block transmission is employed, the transmission waveform shapers 14-1 to 14-T execute, for example, inverse discrete Fourier transform processing and cyclic prefix (CP) attaching processing, for example, before the D/A conversion. Block transmission such as OFDM and single-carrier block transmission refers to a method in which signals are blocked by discrete Fourier transform processing and CP attachment.

The signal processing in the transmission waveform shapers 14-1 to 14-T may be digital processing or analog processing. Transmission signals input from the primary modulators 11-1 to 11-$m$ to the precoder 12 correspond to $\bar{s}(t)$ in Expression (3), and an output signal output from the precoder 12 to the transmission waveform shapers 14-1 to 14-T corresponds to $\bar{\beta} \times \bar{P} \times \bar{s}(t)$ in Expression (3). When NLP is applied in one of the inner precoders 122-1 to 122-C, however, since non-linear processing is performed with respect to the signals $\bar{s}(t)$ and, consequently, the signal output from the precoder 12 cannot always be expressed by a linear model such as $\bar{\beta} \times \bar{P} \times \bar{s}(t)$.

The precoding executed by the precoder 12 enables the plurality of transmission antennas, i.e., the antennas 15-1 to 15-T, to transmit a plurality of signals respectively directed to the plurality of terminals 2.

The receiver 16 performs reception processing with respect to reception signals received from the terminals 2 via the antennas 15-1 to 15-T. The antennas 15-1 to 15-T are transmission/reception antennas in the example given here. However, the antennas 15-1 to 15-T may be used only as transmission antennas, in which further T reception antennas are disposed separately from the antennas 15-1 to 15-T. However, when the base station 1 uses the result of estimating an uplink transmission path as downlink transmission path in the calculation of a precoding matrix by the precoder 12, the antennas 15-1 to 15-T are required to be transmission/reception antennas, and the receiver 16 estimates the transmission path based on reception signals received from the antennas 15-1 to 15-T. The transmission path may be estimated by any method and, for example, an estimation method using a pilot signal that is a known signal may be used. Specifically, a transmission path from one of the terminals 2 can be estimated by the receiver 16 of the base station 1 by identifying each of a plurality of antennas of the terminal 2 based on pilot signals that are orthogonal between the plurality of antennas of the terminal 2 and transmitted from the terminal 2. When the base station 1 uses transmission path information received from the terminals 2 in the calculation of precoding matrices, the receiver 16 supplies the received transmission path information to the precoder 12 via the ordering unit 13.

Figure 7:
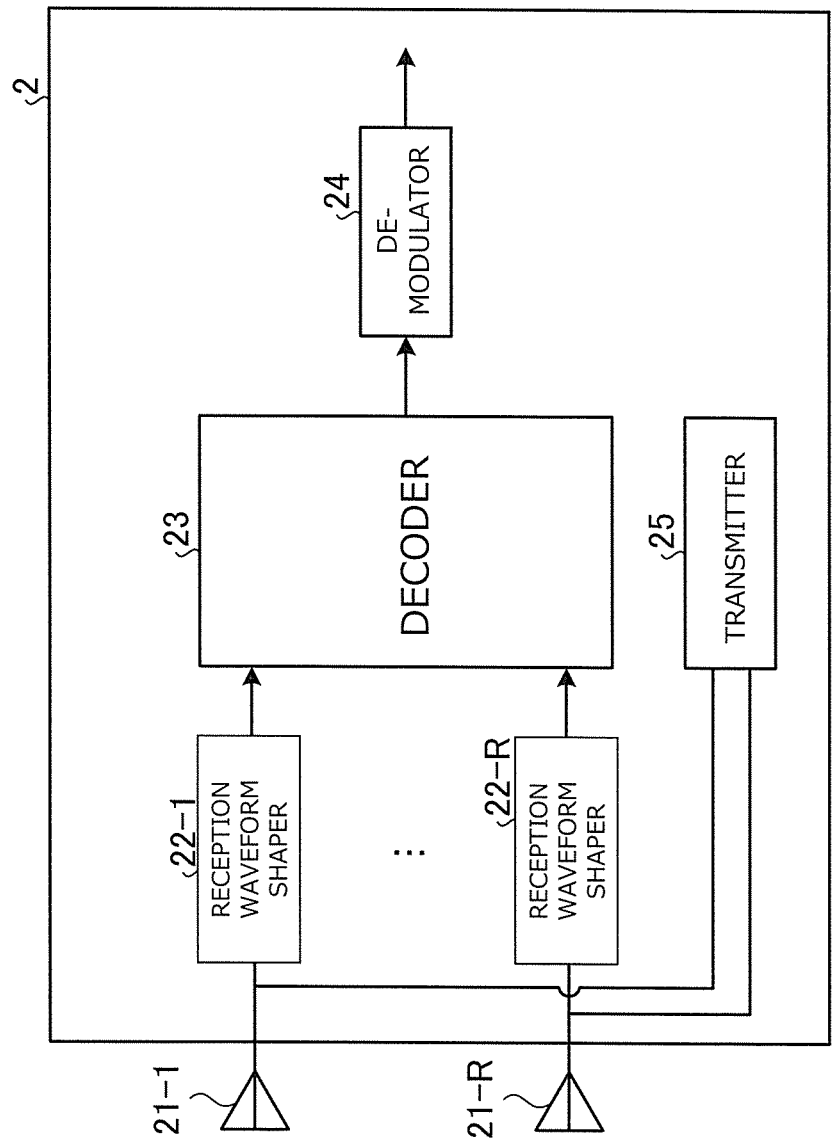
FIG. 7 is a diagram for illustrating an example of the configuration of a reception apparatus according to the present invention.

FIG. 7 is a diagram for illustrating a configuration example of the terminals 2 of the first embodiment. As illustrated in FIG. 7, the terminals 2 each include antennas 21-1 to 21-R, reception waveform shapers 22-1 to 22-R, a decoder 23, a demodulator 24, and a transmitter 25.

The reception waveform shapers 22-1 to 22-R perform reception waveform shaping processing, for example, processing of converting from a radio frequency to a baseband frequency, analog-to-digital (A/D) conversion, and signal filtering processing, with respect to reception signals received by the antennas 21-1 to 21-R, respectively, and output the processed reception signals to the decoder 23. The signal filtering processing is processing of extracting, for example, a signal in a desired frequency band. When a block transmission method is used, the reception waveform shapers 22-1 to 22-R perform CP removal processing and discrete Fourier transform processing as well.

The decoder 23 executes processing for extracting a desired signal, namely, a signal directed to its own terminal from reception signals input from the reception waveform shapers 22-1 to 22-R, and outputs the processed signal to the demodulator 24. The "processing for extracting a signal directed to its own terminal" is referred to as "MIMO decoding processing", and is described later. The decoder 23 is configured to extract a desired signal from among signals received from the base station 1. The decoder 23 executes transmission path estimation processing in the process of MIMO decoding processing.

The demodulator 24 executes demodulation processing, such as de-mapping processing and channel decoding, with respect to a signal output from the decoder 23 to restore a signal transmitted from the base station 1. When a single-carrier block transmission method is employed, the demodulator 24 executes equalization processing to compensate for frequency distortion, and inverse discrete Fourier transform processing. When THP is used as inner precoding in the base station 1, modulo calculation is performed before the de-mapping processing of the demodulator 24. When VP is used as inner precoding, perturbation vector subtraction processing is performed before the de-mapping processing of the demodulator 24. The processing in the reception waveform shapers 22-1 to 22-R may be digital processing or analog processing.

The transmitter 25 generates transmission signals and transmits the transmission signals to the base station 1 from the antennas 21-1 to 21-R. The antennas 21-1 to 21-R are transmission/reception antennas in the example given here, but transmission antennas may be included separately from the antennas 21-1 to 21-R. However, when the base station 1 uses transmission path information received from the terminals 2 in the calculation of precoding matrices at the base station, the transmitter 25 obtains from the decoder 23 transmission path information that is information with respect to a transmission path estimated by the decoder 23, and transmits the obtained transmission path information to the base station 1. When the base station 1 uses the result of estimating an uplink transmission path as downlink transmission path information in calculating precoding matrices, the antennas 21-1 to 21-R are transmission/reception antennas and the transmitter 25 transmits transmission signals from the antennas 21-1 to 21-R.

The hardware configurations of the base station 1 and the terminals 2 in the first embodiment are described next. The components of the base station 1 illustrated in FIG. 5 can each be implemented as hardware, for example, an electronic circuit or an antenna. The primary modulators 11-1 to 11-$m$ are mappers or modulators and, when primary modulation includes discrete Fourier transform processing, a discrete Fourier transform processing circuit is added. The precoder 12 is a processing circuit configured to execute precoding, and the ordering unit 13 is a processing circuit configured to execute ordering. The transmission waveform shapers 14-1 to 14-T are transmission waveform shaping circuits, and are for example constructed from D/A converters, filters, frequency converters, or the like. When the transmission waveform shapers 14-1 to 14-T are to execute CP attachment and inverse discrete Fourier transform processing, a CP attachment circuit and an inverse discrete Fourier transform processing circuit are included in each of the transmission waveform shapers 14-1 to 14-T.

The processing circuits implementing the precoder 12 and the ordering unit 13 may be dedicated hardware for the exclusive use, or a control circuit including a memory and a central processing unit (CPU, also called a central processing device, a processing device, an arithmetic device, a microprocessor, a microcomputer, a processor, and a digital signal processor (DSP)), which executes a program stored in the memory. Examples of the memory here include a random access memory (RAM), a read-only memory (ROM), a flash memory, an erasable programmable read-only memory (EPROM), an electrically erasable programmable read-only memory (EEPROM), and other non-volatile or volatile semiconductor memories, a magnetic disk, a flexible disk, an optical disc, a compact disc, a mini disc, and a digital versatile disk (DVD).

Figure 8:
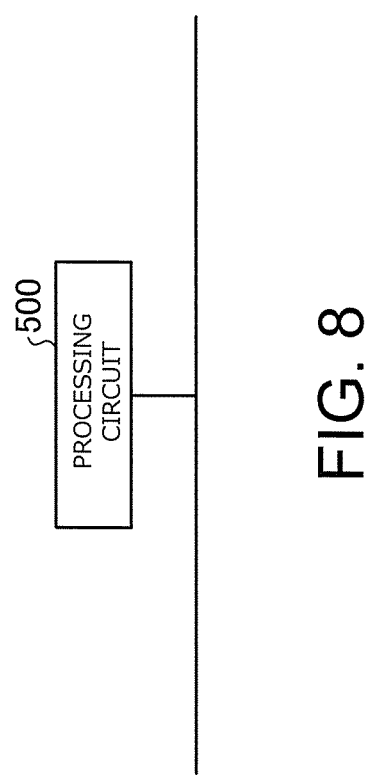
FIG. 8 is a diagram for illustrating an example of the hardware configuration of the precoder of the present invention.

When the precoder 12 and the ordering unit 13 are realized by dedicated hardware, the dedicated hardware are each a single circuit, a multiple-circuit, a programmed processor, a multiple-programmed processor, an application-specific integrated circuit (ASIC), or a field programmable gate array (FPGA), or a combination of those. When a processing circuit is realized by dedicated hardware, the processing circuit is, for example, a processing circuit 500 illustrated in FIG. 8.

Figure 9:
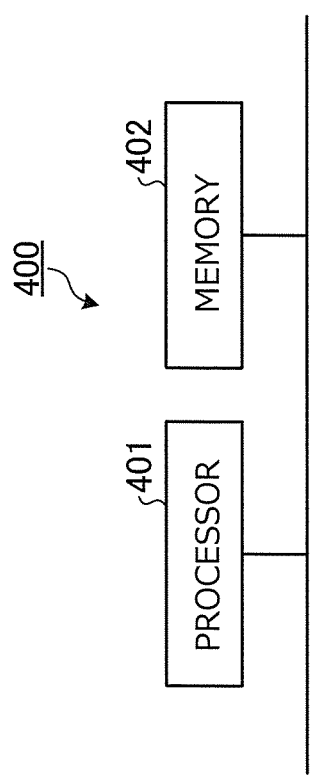
FIG. 9 is a diagram for illustrating an example of the configuration of the precoder of the present invention in which a CPU is included.

When the precoder 12 and the ordering unit 13 are implemented by a control circuit including a CPU, the control circuit is, for example, a control circuit 400 having a configuration illustrated in FIG. 9. The control circuit 400 includes a processor 401, which is a CPU, and a memory 402 as illustrated in FIG. 9. When the control circuit 400 illustrated in FIG. 9 is used to implement the precoder 12 and the ordering unit 13, the precoder 12 and the ordering unit 13 are implemented by the processor 401 which reads and executes programs that are stored in the memory 402 and that correspond to the processing of the precoder 12 and the processing of the ordering unit 13. The memory 402 is used also as a temporary memory in processing procedures executed by the processor 401.

At least some of the primary modulators 11-1 to 11-$m$ and the transmission waveform shapers 14-1 to 14-T may be implemented by processing circuits that are dedicated hardware for the exclusive use, or by the control circuit 400, similarly to the case for the precoder 12 and the ordering unit 13.

The components of each terminal 2 illustrated in FIG. 7 can each be implemented as hardware, for example, an electronic circuit or an antenna. The reception waveform shapers 22-1 to 22-R are reception waveform shaping circuits, and are for example constructed from A/D converters, filters, frequency converters, or the like. When the reception waveform shapers 22-1 to 22-R are to execute CP removal and discrete Fourier transform processing, a CP removal circuit and a discrete Fourier transform processing circuit are included in each of the reception waveform shapers 22-1 to 22-R. The decoder 23 is a processing circuit, and a demodulator 24 is a demodulator or a de-mapper. When the demodulator 24 is to execute equalization processing, inverse discrete Fourier transform processing, and other types of processing, the demodulator 24 includes an equalizer, an inverse discrete Fourier transform circuit, and the like.

The processing circuit implementing the decoder 23 may be implemented by dedicated hardware for the exclusive use or by the control circuit 400 described above with reference to FIG. 9. When the control circuit 400 illustrated in FIG. 9 is used to implement the decoder 23, the decoder 23 is implemented by the processor 401 by reading and executing a program that is stored in the memory 402 and that corresponds to the processing of the decoder 23. At least some of the reception waveform shapers 22-1 to 22-R and the demodulator 24 may be implemented by processing circuits that are dedicated hardware for the exclusive use, or by the control circuit 400, similarly to the case for the decoder 23.

Figure 10:
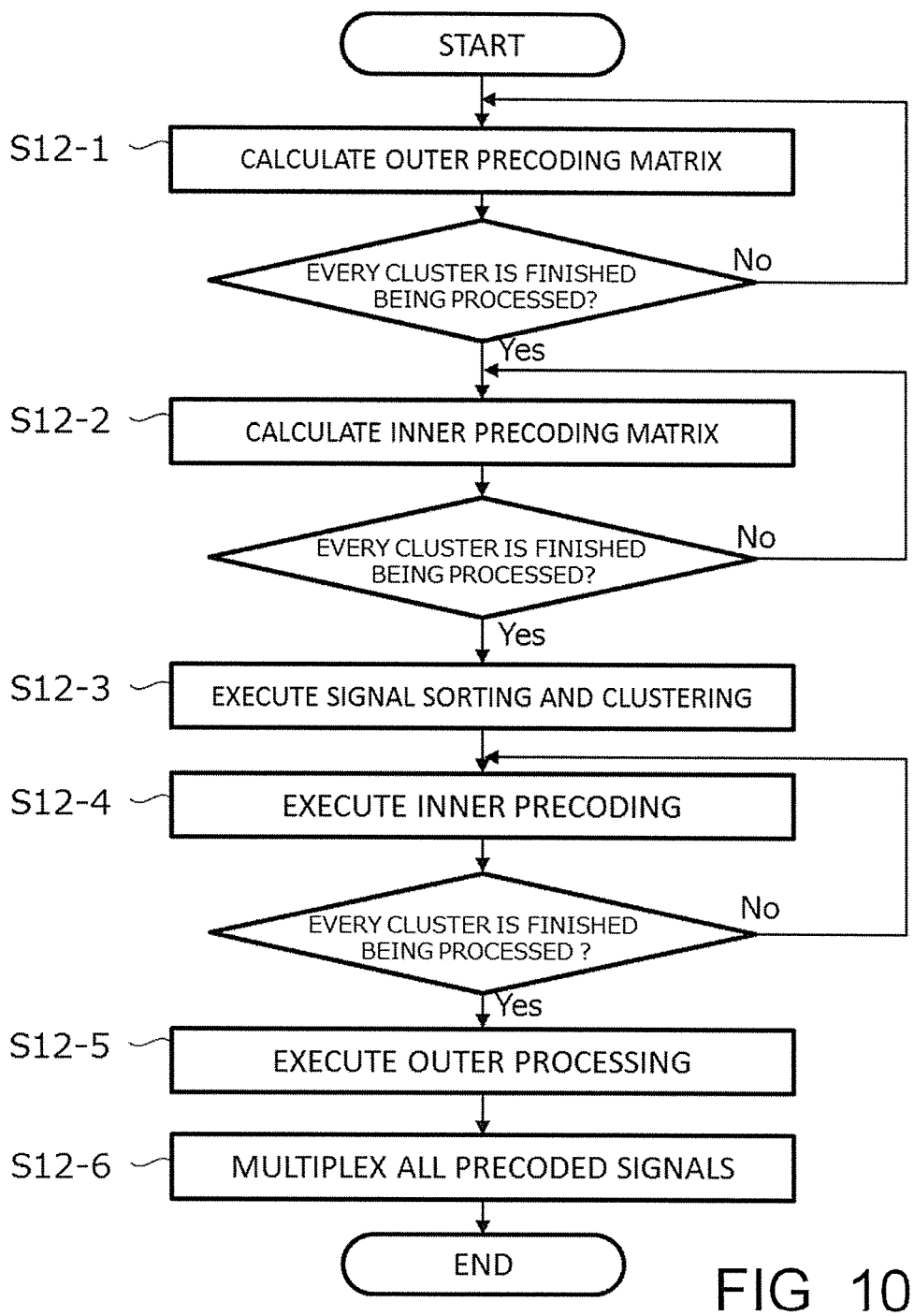
FIG. 10 is a flow chart for illustrating an example of processing steps in the precoder of the present invention.

FIG. 10 is a flow chart for illustrating an example of processing steps in the precoder 12 of the first embodiment. The precoder 12 first calculates an outer precoding matrix for every user cluster based on the order and user cluster configuration determined by the ordering unit 13 (Step S12-1). This corresponds to the processing of the outer precoding calculator 125. The precoder 12 next calculates inner precoding matrix for each user cluster based on the outer precoding matrices obtained in Step S12-1, and on a transmission path matrix input from the ordering unit 13 (Step S12-2). This corresponds to the processing of the inner precoding calculator 126. After the outer precoding matrix and the inner precoding matrix are calculated, transmission signals of all terminals 2 are sorted so that User Clusters 1 to C are configured based on user ordering information, which is notified from the ordering unit 13 (Step S12-3). This corresponds to the processing of the user clustering unit 121. Inner precoding is performed with respect to the sorted transmission signals on a user cluster-by-user cluster basis (Step S12-4). This corresponds to the processing of the inner precoders 122-1 to 122-C. Outer precoding is performed on the signals in which IUI is now solved within each user cluster by applying the inner precoding (Step S12-5). This corresponds to the processing of the outer precoder 123. Lastly, the precoded signals of all terminals 2 are added together (Step S12-6). This corresponds to the processing of the multiplexer 124.

The processing of the ordering unit 13 is described next. The ordering unit 13 determines the user cluster configuration and the sorting order of the terminals 2 in order to execute user clustering in the precoder 12. In the following, the act of determining the user cluster configuration and the sorting order of the terminals 2 is referred to as "user ordering", and information with respect to the user cluster configuration and the sorting order of the terminals 2 is referred to as "user ordering information". The ordering unit 13 determines power distribution to each of the terminals 2.

Figure 11:
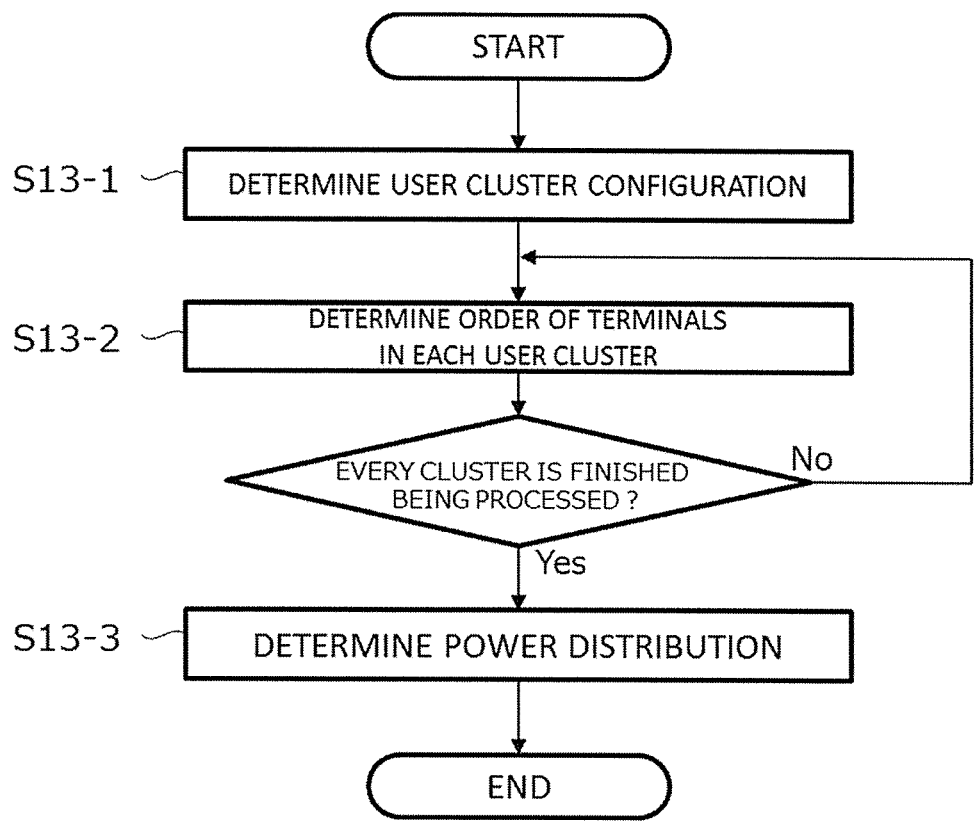
FIG. 11 is a flow chart for illustrating an example of processing steps in an ordering unit of the present invention.

FIG. 11 is a flow chart for illustrating an example of processing steps of the ordering unit 13 of the first embodiment. The ordering unit 13 uses one of methods described later to determine the user cluster configuration of the terminals 2 (Step S13-1), and determine the order of the terminals 2 in each user cluster (Step S13-2). The ordering unit 13 notifies the determined user ordering information to the precoder 12. Examples of the method of determining the user cluster configuration include, but are not limited to, grouping of terminals adjacent to each other in geographical location, in particular, terminals close to each other or different from each other in azimuth angle viewed from the base station 1, grouping of terminals at short distances or long distances from the base station, grouping of adjacent terminals based on a correlation between transmission path matrices, i.e., grouping of terminals large or small in the magnitude of the diagonal term in a cross-correlation matrix of the terminals' transmission path matrices described above, grouping of terminals equal to each other or different from each other in required transmission rate, and grouping of terminals equal to each other or different from each other in travel speed. Examples of the method of determining the order of the terminals 2 in a user cluster include, but are not limited to, the descending or ascending order of transmission path gains (the squares of Frobenius norms of transmission path matrices) of the terminals 2, the descending or ascending order of non-negative eigenvalues or non-negative singular values of transmission path matrices about transmission paths from the base station 1 to the respective terminals 2, an order based on the geographical locations of adjacent terminals, e.g., the ascending or descending order of azimuth angles viewed from the base station 1, the ascending or descending order of distance from the base station, and an order based on a correlation between transmission path matrices of adjacent terminals, i.e., the ascending or descending order of the magnitude of the diagonal term in a cross-correlation matrix of the terminals' transmission path matrices described above.

The ordering unit 13 determines power distribution of the terminals 2 (Step S13-3). The ordering unit 13 notifies the result of power distribution, namely, the amounts of power distributed to the respective terminals 2, to the precoder 12. At this point, transmission path information with respect to transmission paths between the base station and the terminals 2 to which user ordering has been applied, that is, the terminals 2 sorted in the determined order, is notified to the precoder 12 together with the power distribution information. Examples of how power is distributed include, but are not limited to, distribution according to a water-filling theorem and based on transmission path gains of the terminals 2, and distribution that makes reception quality uniform in all terminals 2, i.e., distribution that gives every terminal 2 the same value as the product of the terminal's transmission path gain and distributed power. Steps S13-1 and S13-2 and Step S13-3 may be executed in reverse order. Specifically, Step S13-3, Step S13-1, and Step S13-2 may be executed in the stated order.

Processing in the decoder 23 of each terminal 2 is described next. The description deals with a transmission path component observed in the terminal 2, which is a reception apparatus configured to receive a beam formed by the base station 1 with the use of the system precoding matrix of the first embodiment described above, specifically, a matrix having T rows and (m×$N_w$) columns and aligning $B_1$ to $B_m$ in the column direction. IUI is solved completely by the precoding in the transmission base station, and it is accordingly sufficient to execute MIMO decoding processing with the use of a desired component, namely, $H_iB_i$, out of an effective transmission path matrix observed in the terminal 2-$i$.

The decoder 23 of the terminal 2 detects the transmission signal $s_i$ (t) transmitted to the terminal 2-$i$ based on the reception signal $r_i$ (t). The detection of the transmission signal $s_i$ (t) based on the reception signal $r_i$ (t) is achievable by general MIMO decoding processing. For example, a linear detection method, such as zero forcing and minimum mean square error (MMSE) standards, is applicable as described in T. Ohgane, T. Nishimura, and Y Ogawa, "Applications of Space Division Multiplexing and Those Performance in a MIMO Channel", IEICE Trans. Commun., vol. E88-B, no. 5, pp. 1843-1851, May 2005. A non-linear detection method, such as maximum likelihood estimation and an interference canceller (IC), is also applicable, and any type of MIMO decoding processing may be used. The MIMO decoding processing may be executed by the decoder 23 to the signal $y_i$(t) prior to the calculation of the product of multiplication by a reception weight, instead of the signal $r_i$(t) after the calculation of the product of multiplication by a reception weight. The MIMO decoding processing in this case, too, is the same as the general MIMO decoding processing.

In the description given above, the number T of the antenna of the base station 1 and the number of the reception branch of the terminals 2 satisfy a relationship $T \geq N_{w,total} - N_w = (m-1) \times N_w$. However, no restriction is put on the number of antennas included in the terminals 2, and the present invention is applicable also to cases in which the number of antennas varies from one terminal 2 to another and the number of reception branches varies from one terminal 2 to another. When the number $N_{R,j}$ of the antennas and the number $N_{w,j}$ of the branches of the terminal 2-$j$ satisfy a relationship $N_{R,j} \geq N_{w,j}$, and the terminal 2-$j$ is an IUI terminal corresponding to the desired terminal 2-$i$, the present invention is applicable when the base station 1 satisfies a relationship $T \geq (\Sigma_{k-1}^{m}(N_{w,k}))$ with any desired terminal 2.

The description given above takes as an example a mode in which the control station 3 configured to conduct scheduling is provided independently of the base station 1. The present invention is not limited thereto, and the control station 3 and the base station 1 may be included in the same apparatus.

Figure 12:
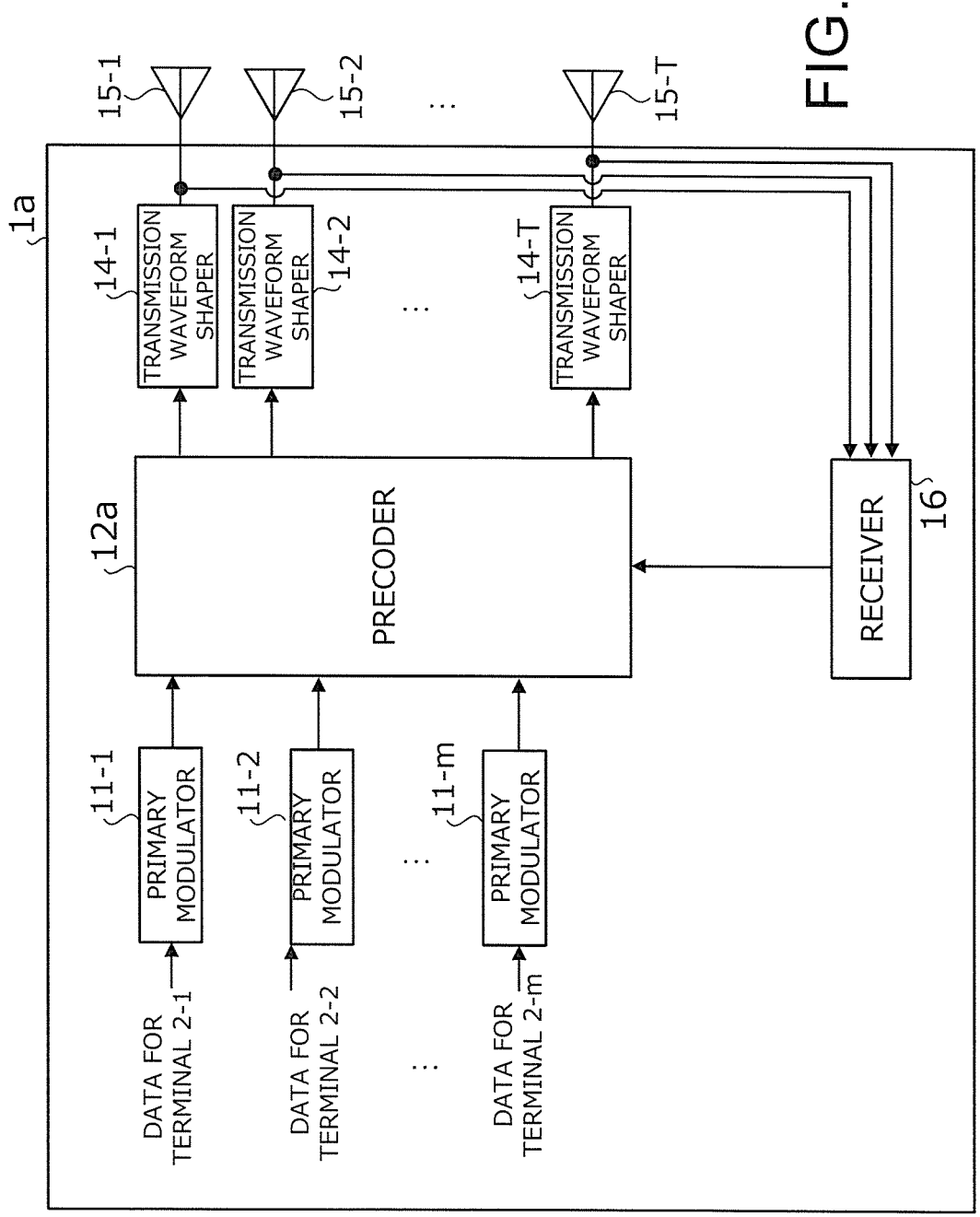
FIG. 12 is a diagram for illustrating an example of the configuration of the base station in the first embodiment of the present invention.

The ordering unit 13, which is included in the example illustrated in FIG. 5, may be however omitted so as to obtain a configuration illustrated in FIG. 12. FIG. 12 is a diagram for illustrating a configuration example of a base station 1$a$, which does not include the ordering unit 13. In FIG. 12, components having the same functions as those of the components of the base station 1 in FIG. 5 are denoted by the same reference symbols that are used in FIG. 5. As is understood from this, differences between FIG. 12 and FIG. 5 are that the ordering unit 13 is not provided in FIG. 12, and that a precoder 12$a$ is provided in FIG. 12 in place of the precoder 12 of FIG. 5. The rest of the configuration of FIG. 12 is the same as FIG. 5. In the base station 1$a$ of FIG. 12, while sorting by the ordering unit 13 is not executed, the precoder 12$a$ is capable of executing user clustering by determining the user cluster configuration and the sorting order of terminals in each cluster in the manner described above. In other words, a function of the ordering unit 13 is included in the precoder 12$a$. The base station 1$a$ of FIG. 12, too, is accordingly capable of forming orthogonal user clusters as in the outer precoding executed by the base station 1 of FIG. 5.

Figure 13:
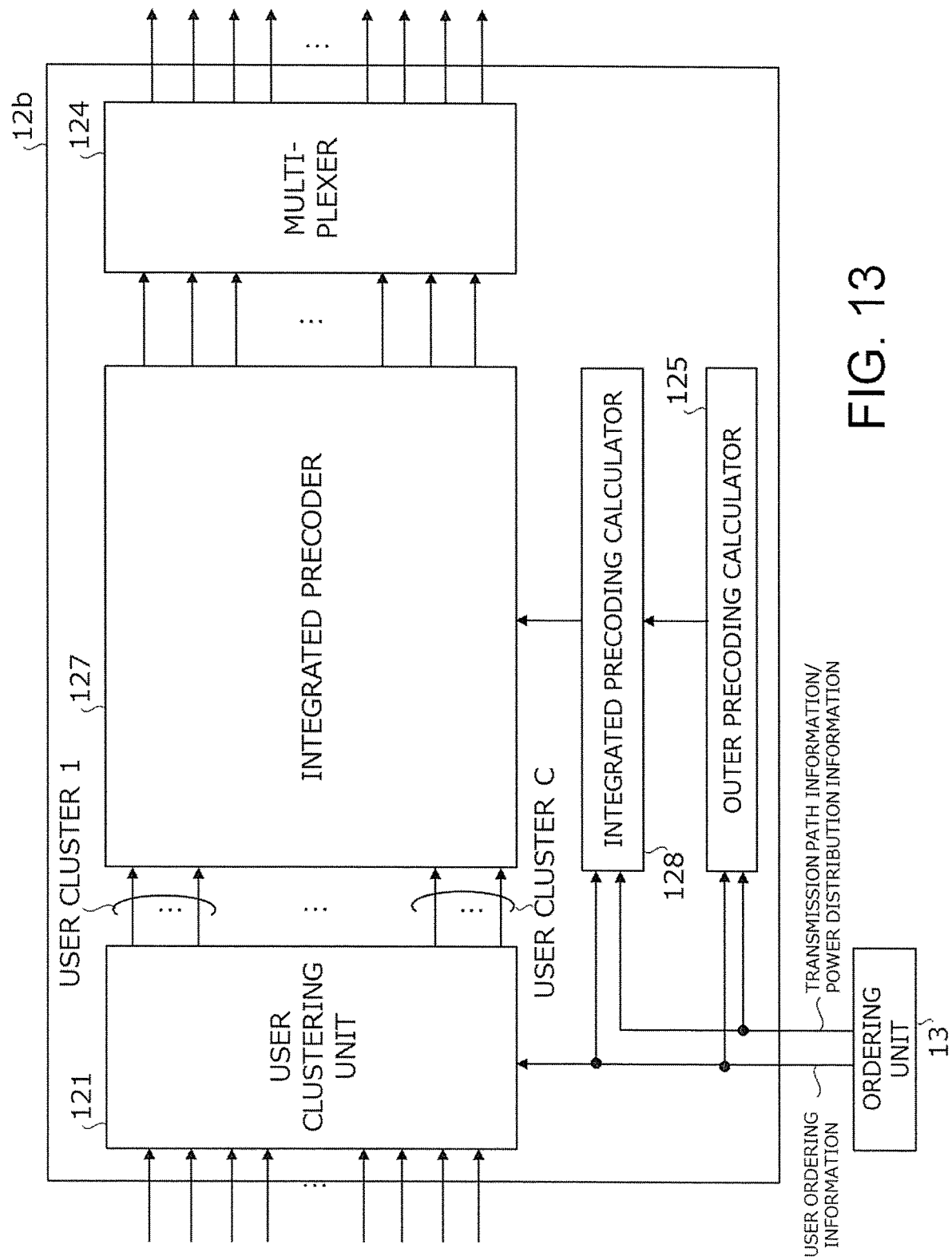
FIG. 13 is a diagram for illustrating another example of the configuration of the precoder in the first embodiment of the present invention.

In the example illustrated in FIG. 6, precoding is executed by the inner precoders 122-1 to 122-C and the outer precoder 123 independently of each other. The present invention is not limited thereto, and may employ a configuration illustrated in FIG. 13 in which inner precoding and outer precoding are executed in an integrated manner. FIG. 13 is a diagram for illustrating a configuration example of a precoder 12$b$, which includes an integrated precoder 127 configured to execute inner precoding and outer precoding in an integrated manner. In FIG. 13, components having the same functions as those of the components of the precoder 12 in FIG. 6 are denoted by the same reference symbols that are used in FIG. 6. As is understood from this, differences between FIG. 6 and FIG. 13 are that the integrated precoder 127 is provided in FIG. 13 in place of the inner precoders 122-1 to 122-C and outer precoder 123 of FIG. 6, and that an integrated precoding calculator 128 is provided in FIG. 13 in place of the inner precoding calculator 126 of FIG. 6. The rest of the configuration of FIG. 13 is the same as FIG. 6. In the precoder 12$b$ of FIG. 13, the integrated precoder 127 executes integrated precoding in which the inner precoding and outer precoding described above are conducted in an integrated manner. The integrated precoding uses a precoding matrix supplied from the integrated precoding calculator 128. The integrated precoding calculator 128 calculates an inner precoding matrix based on an outer precoding matrix input from the outer precoding calculator 125, obtains a matrix by multiplying the outer precoding matrix and the inner precoding matrix, namely, the system precoding matrix $\bar{B}$, and outputs the system precoding matrix $\bar{B}$ to the integrated precoder 127. The precoder 12$b$ of FIG. 13, too, is capable of the precoding executed by the precoder 12 of FIG. 6.

As described above, the base station 1 in the first embodiment handles user clusters, which are created by grouping a plurality of terminals 2, as pseudo-users, and executes outer precoding in which BD is applied to the pseudo-users, thereby solving IUCI. According to the first embodiment, a plurality of user clusters can be separated spatially and orthogonally by performing transmission precoding, that is obtained by using BD method, with respect to the user clusters. The whole MU-MIMO downlink can consequently be segmented into small-scale MU-MIMO downlink matter on a user cluster-by-user cluster basis. The resultant effect is that, even when there are a large number of users, problems in MU-MIMO downlink are easily solved without increasing the apparatus scale and without complicating scheduling.

Second Embodiment

Figure 14:
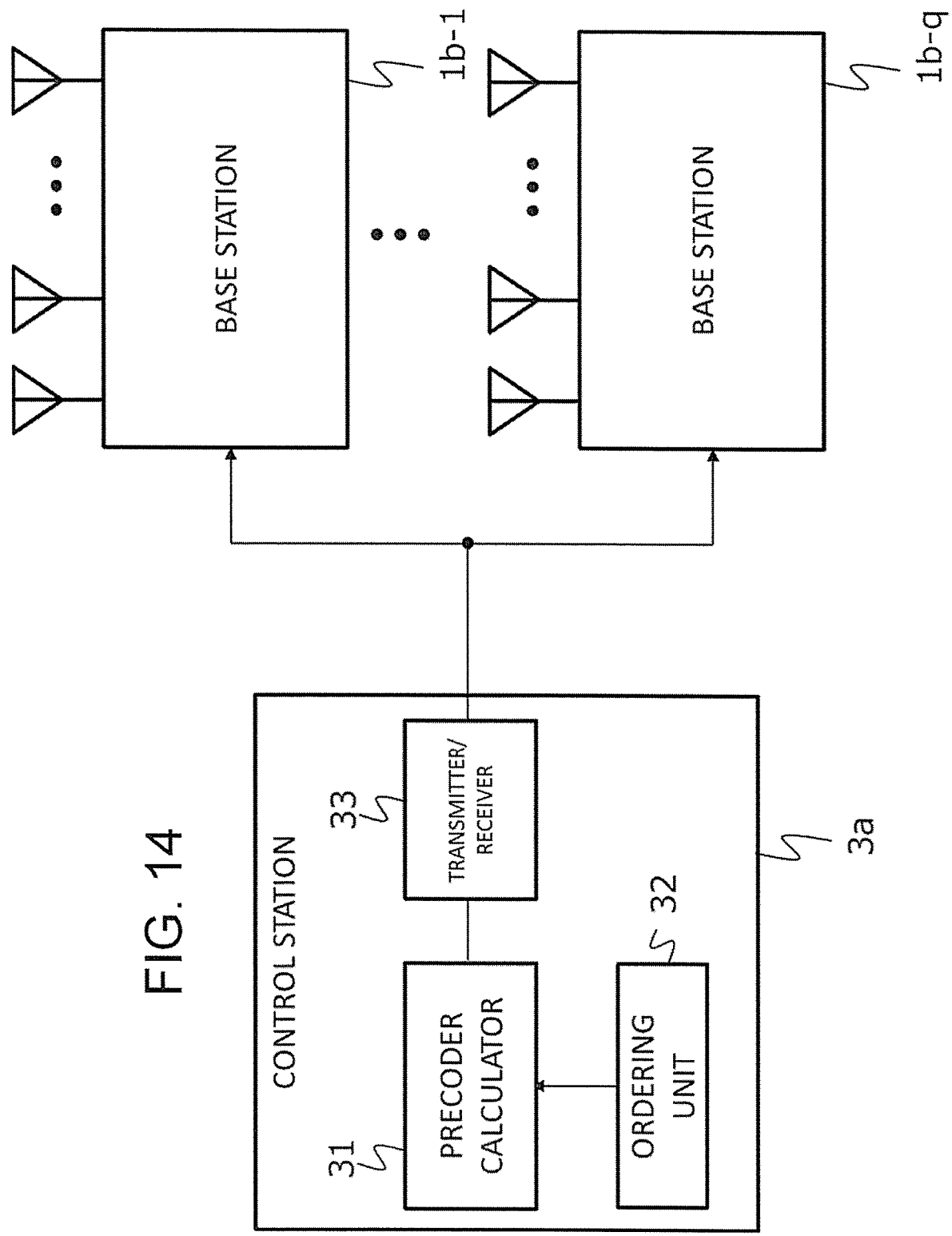
FIG. 14 is a diagram for illustrating the configuration of a transmission apparatus according to a second embodiment of the present invention.

FIG. 14 is a diagram for illustrating a configuration example of a communication system according to a second embodiment of the present invention. The terminals 2 are not shown in FIG. 14. The communication system according to the second embodiment includes, a control station 3a and a plurality of base stations 1n-1 to 1b-q as illustrated in FIG. 14. The base stations 1b-1 to 1b-q are controlled by the control station 3a, and q represents an integer equal to or more than 2. The present invention is not limited to the example described in the first embodiment in which beams are formed by the antennas 15-1 to 15-T mounted to the base station 1, and a system precoding matrix similar to the one in the first embodiment can be used also when T antennas are dispersed among a plurality of base stations. The second embodiment therefore deals with the case in which T antennas are dispersed among a plurality of base stations. The base stations 1n-1 to 1b-q are referred to as "base stations 1" when one does not need to be distinguished from another. The total number of antennas included in the base stations 1n-1 to 1b-q is T in the second embodiment. The control station 3a conducts scheduling in which m terminals to be communication targets are selected out of more than m communication candidate terminals as in the first embodiment. The following description of the embodiment assumes that the terminals 2-1 to 2-m are selected as communication targets as the result of scheduling executed by the control station 3a.

The control station 3a includes a precoder calculator 31, an ordering unit 32, and a transmitter/receiver 33 as illustrated in FIG. 14. The precoder calculator 31 executes processing equivalent to the joint execution of the processing of the outer precoding calculator 125 and the processing of the integrated precoding calculator 128 in the precoder 12b of the first embodiment. Specifically, the precoder calculator 31 groups the terminals 2 that are transmission destinations of transmission signals transmitted from the base stations 1n-1 to 1b-q into a plurality of user clusters, subsequently calculates an outer precoding matrix for solving IUCI by BD and an inner precoding matrix for solving IUI within each user cluster, obtaining a system precoding matrix by multiplying the outer precoding matrix and the inner precoding matrix, and outputs the system precoding matrix to the transmitter/receiver 33. Transmission path information used in the calculation of the system precoding matrix, however, is received from the base stations 1n-1 to 1b-q via the transmitter/receiver 33. The base stations 1n-1 to 1b-q obtain the transmission path information in the same way as in the first embodiment. The ordering unit 32 executes the same processing that is executed by the ordering unit 13 of the first embodiment. The transmitter/receiver 33 executes reception processing of receiving signals from the base stations 1n-1 to 1b-q, and transmission processing of transmitting signals to the base stations 1n-1 to 1b-q. The transmitter/receiver 33 transmits the system precoding matrix, which is a precoding matrix calculated by the precoder calculator 31, and user ordering information and power distribution information, which are calculated by the ordering unit 32, to each of the base stations 1n-1 to 1b-q. The base stations 1n-1 to 1b-q each include one or more transmission antennas.

Figure 15:
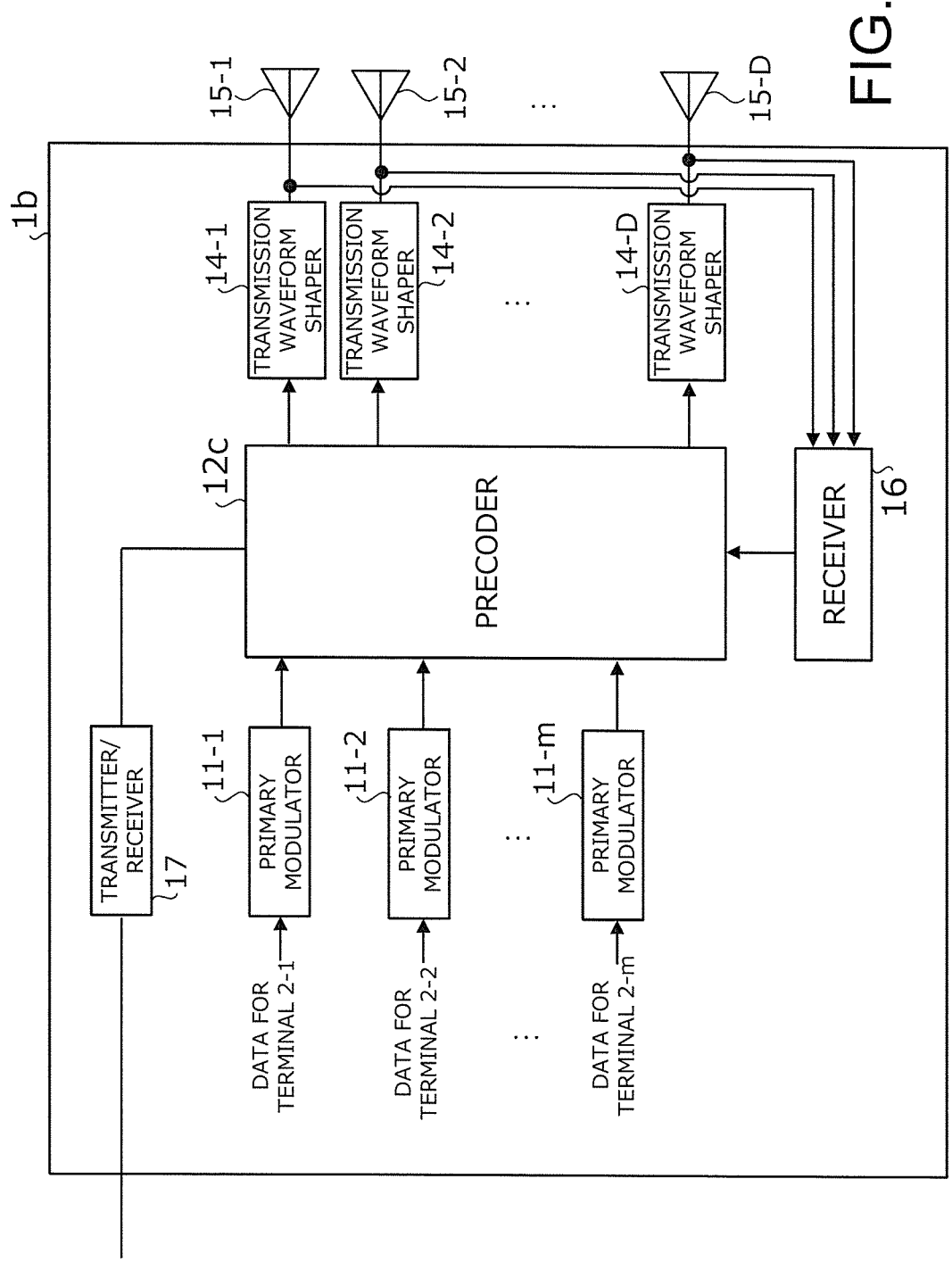
FIG. 15 is a diagram for illustrating the configuration of a base station in the second embodiment of the present invention.

FIG. 15 is a diagram for illustrating a configuration example of each base station 1b of the second embodiment. As illustrated in FIG. 15, the base stations 1b is the same as the base station 1a of the first embodiment, except that a transmitter/receiver 17 is added to the base station 1 of the first embodiment, and that the precoder 12b is replaced by a precoder 12c. However, the number of transmission waveform shapers and the number of antennas are each D, and D is an integer equal to or more than 1. Components having the same functions as those in the first embodiment are denoted by the same reference symbols that are used in the first embodiment, in order to omit duplicate descriptions.

The transmitter/receiver 17 executes reception processing of receiving a signal from the control station 3a, and transmission processing of transmitting a signal to the control station 3a. The transmitter/receiver 17 obtains transmission path information from the receiver 16, and transmits the transmission path information to the control station 3a. The transmitter/receiver 17 outputs system precoding matrix information, transmission path matrix information, user ordering information, and power distribution information, which are received from the control station 3a, to the precoder 12c. The precoder 12c generates a power distribution matrix Pi based on the power distribution received from the transmitter/receiver 17, multiplies transmission signals output from the primary modulators 11-1 to 11-m by the power distribution matrix Pi, further multiplies transmission signals output from the primary modulators 11-1 to 11-m by the system precoding matrix $\overline{B}$, which is received from the transmitter/receiver 17, and outputs the calculated products to the transmission waveform shapers 14-1 to 14-D. The precoder 12c may apply not only linear precoding but also NLP to the transmission signals, with the use of the system precoding matrix and the transmission path matrix.

The hardware configurations of the control station 3a and each base station 1b are described next. Of the components of the base station 1b, the ones that are the same as in the first embodiment can be implemented by the hardware configuration described in the first embodiment. The precoder calculator 31 and the ordering unit 32 in the control station 3a are processing circuits. The precoder calculator 31 and the ordering unit 32 may be dedicated hardware for the exclusive use, or may be a control circuit including a memory and a CPU, which executes a program stored in the memory, as is the case for the processing circuits implementing the precoders 12, 12a, and 12b and the ordering unit 13 in the first embodiment. The control circuit implementing the precoder calculator 31 and the ordering unit 32 is, for example, the control circuit 400 illustrated in FIG. 9. The precoder 12c is a processing circuit as well, and this control circuit, too can be dedicated hardware or a control circuit including a memory and a CPU, which executes a program stored in the memory. The control circuit implementing the precoder 12c is, for example, the control circuit 400 illustrated in FIG. 9.

The transmitter/receiver 33 of the control station 3a includes a transmitter and a receiver. The transmitter/receiver 17 of each base station 1b includes a transmitter and a receiver as well.

As described above, according to the second embodiment, the control station 3a calculates the same system precoding matrix $\overline{B}$ as in the first embodiment, and notifies the system precoding matrix $\overline{B}$, a transmission path matrix, user ordering information, and power distribution information to each base station 1b. The same effect as in the first embodiment can accordingly be obtained also when a system includes the plurality of base stations 1b.

The configurations described in the first embodiment and the second embodiment are given as an example of the specifics of the present invention, and can be combined with other known technologies, and part of the configurations may be omitted or modified without departing from the spirit of the present invention.

The invention claimed is:

1. A transmission apparatus, comprising:
a plurality of transmission antennas capable of forming beams directed to a plurality of reception apparatus; and
a linear precoder to perform linear precoding with respect to transmission signals transmitted from the plurality of transmission antennas,
wherein the plurality of reception apparatus include:
at least one first reception apparatus, to which the transmission signals are transmitted; and
second reception apparatus, which are reception apparatus other than the at least one first reception apparatus,
wherein the transmission apparatus further comprises:
a non-linear precoder to perform non-linear precoding with respect to the transmission signals transmitted from the plurality of transmission antennas so as to remove interference among the at least one first reception apparatus,
wherein the linear precoder multiplies the transmission signals subjected to the non-linear precoding by the non-linear precoder, by a linear precoding matrix received from a control station which calculates the precoding matrix for making the received power in the second reception apparatus equal to or less than the threshold.

2. The transmission apparatus according to claim 1, wherein the at least one first reception apparatus are selected from the plurality of reception apparatus based on correlation of transmission path matrices of transmission paths between the plurality of reception apparatus and the transmission apparatus.

3. The transmission apparatus according to claim 1, wherein the at least one first reception apparatus are selected from the plurality of reception apparatus based on a degree of geographical distance between the plurality of reception apparatus.

4. The transmission apparatus according to claim 1, wherein the at least one first reception apparatus are selected from the plurality of reception apparatus based on transmission rates required of the plurality of reception apparatus.

5. The transmission apparatus according to claim 1, wherein the at least one first reception apparatus are selected from the plurality of reception apparatus based on travel speeds of the plurality of reception apparatus.

6. The transmission apparatus according to claim 1, further comprising an ordering indicator to determine a combination of the at least one first reception apparatus and a combination of the second reception apparatus in the linear precoding.

7. The transmission apparatus according to claim 6, wherein the ordering indicator determines power distribution to the at least one first reception apparatus, and
wherein the linear precoder multiplies the transmission signals transmitted from the plurality of transmission antennas by a power distribution matrix, which corresponds to the determined power distribution, and by a linear precoding matrix for performing the linear precoding.

8. The transmission apparatus according to claim 7, wherein the ordering indicator determines the power distribution by following a water-filling theorem.

9. The transmission apparatus according to claim 7, wherein the ordering indicator determines the power distribution so that reception quality is uniform in the plurality of reception apparatus.

10. The transmission apparatus according to claim 6, wherein the ordering indicator determines the combination of the at least one first reception apparatus based on a geographical location between the at least one first reception apparatus.

11. The transmission apparatus according to claim 6, wherein the ordering indicator determines the combination of the at least one first reception apparatus based on correlation between transmission path matrices of the at least one first reception apparatus.

12. The transmission apparatus according to claim 6, wherein the ordering indicator determines the combination of the at least one first reception apparatus based on travel speeds of the at least one first reception apparatus.

13. A reception apparatus, which receives the transmission signals transmitted from the transmission apparatus of claim 1, the reception apparatus comprising:
a decoder to extract a desired signal from the transmission signals received from the transmission apparatus; and
a demodulator to extract bit information from the signal extracted by the decoder.

14. The reception apparatus according to claim 13, wherein the demodulator performs modulo calculation as pre-processing of the bit information extraction.

15. The reception apparatus according to claim 13, wherein the demodulator performs perturbation vector subtraction processing or perturbation vector addition processing as pre-processing of the bit information extraction.

16. A control station, which is included in a communication system capable of forming beams directed to a plurality of reception apparatus with a plurality of transmission antennas mounted to a plurality of transmission apparatus,
the plurality of reception apparatus including:
at least one first reception apparatus, to which transmission signals are transmitted from the plurality of transmission antennas; and
second reception apparatus, which are reception apparatus other than the at least one first reception apparatus,
the control station comprising:
a precoder calculator to calculate a linear precoding matrix for performing linear precoding with respect to the transmission signals transmitted from the plurality of transmission antennas so that received power in the second reception apparatus among the plurality of reception apparatus is equal to or less than a threshold; and
a transmitter/receiver to transmit the linear precoding matrix to the plurality of transmission apparatus, wherein each of the plurality of transmission apparatus includes:
- a transmitter/receiver to receive the linear precoding matrix; and
- a linear precoder to perform linear precoding by using the linear precoding matrix received by the transmitter/receiver,
- a non-linear precoder to perform non-linear precoding with respect to the transmission signals transmitted from the plurality of transmission antennas so as to remove interference among the at least one first reception apparatus,
- wherein the linear precoder multiplies the transmission signals subjected to the non-linear precoding by the non-linear precoder, by the linear precoding matrix received by the transmitter/receiver.

17. A communication system, comprising:
a transmission apparatus, comprising:
- a plurality of transmission antennas capable of forming beams directed to a plurality of reception apparatus; and
- a linear precoder to perform linear precoding with respect to transmission signals transmitted from the plurality of transmission antennas,
wherein the plurality of reception apparatus include:
- at least one first reception apparatus, to which the transmission signals are transmitted; and
- second reception apparatus, which are reception apparatus other than the at least one first reception apparatus, and
wherein the linear precoder performs the linear precoding with respect to the transmission signals transmitted from the plurality of transmission antennas so that received power in the second reception apparatus among the plurality of reception apparatus is equal to or less than a threshold,
wherein the transmission apparatus further comprises:
- a receiver that receives a linear precoding matrix from a control station which calculates the linear precoding matrix so that received power in the second reception apparatus among the plurality of reception apparatus is equal to or less than a threshold, and
- a non-linear precoder to perform non-linear precoding with respect to the transmission signals transmitted from the plurality of transmission antennas so as to remove interference among the at least one first reception apparatus,
wherein the linear precoder multiplies the transmission signals subjected to the non-linear precoding by the non-linear precoder, by the received linear precoding matrix, which is a precoding matrix for making the received power in the second reception apparatus equal to or less than the threshold; and
the reception apparatus comprising
- a decoder to extract a desired signal from the transmission signals received from the transmission apparatus; and
- a demodulator to extract bit information from the signal extracted by the decoder.

18. A communication system, comprising a control station and a plurality of transmission apparatus, and capable of forming beams directed to a plurality of reception apparatus with a plurality of transmission antennas mounted to the plurality of transmission apparatus,
wherein the plurality of reception apparatus include:
- at least one first reception apparatus, to which transmission signals are transmitted from the plurality of transmission antennas; and
- second reception apparatus, which are reception apparatus other than the at least one first reception apparatus,
wherein the control station includes:
- a precoder calculator to calculate a linear precoding matrix for performing linear precoding with respect to the transmission signals transmitted from the plurality of transmission antennas so that received power in the second reception apparatus among the plurality of reception apparatus is equal to or less than a threshold; and
- a transmitter/receiver to transmit the linear precoding matrix to the plurality of transmission apparatus, and
wherein each of the plurality of transmission apparatus includes:
- a transmitter/receiver to receive the linear precoding matrix; and
- a linear precoder to perform linear precoding by using the linear precoding matrix received by the transmitter/receiver,
- a non-linear precoder to perform non-linear precoding with respect to the transmission signals transmitted from the plurality of transmission antennas so as to remove interference among the at least one first reception apparatus,
- wherein the linear precoder multiplies the transmission signals subjected to the non-linear precoding by the non-linear precoder, by the linear precoding matrix received by the transmitter/receiver.

19. A transmission precoding method, which is performed in a transmission apparatus including a plurality of transmission antennas capable of forming beams directed to a plurality of reception apparatus, the plurality of reception apparatus including:
- at least one first reception apparatus, to which transmission signals are transmitted from the plurality of transmission antennas; and
- second reception apparatus, which are reception apparatus other than the at least one first reception apparatus,
the transmission precoding method comprising:
- determining the at least one first reception apparatus from among the plurality of reception apparatus; and
- performing non-linear precoding with respect to the transmission signals transmitted from the plurality of transmission antennas so as to remove interference among the at least one first reception apparatus,
- receiving a linear precoding matrix from a control station which calculates the linear precoding matrix so that received power in the second reception apparatus among the plurality of reception apparatus is equal to or less than a threshold; and
- performing linear precoding using the received linear precoding matrix with respect to the transmission signals after subjected to the non-linear precoding so that received power in the second reception apparatus is equal to or less than a threshold.

20. A transmission apparatus, comprising:
a plurality of transmission antennas capable of forming beams directed to a plurality of reception apparatus;
a linear precoder to perform linear precoding with respect to transmission signals transmitted from the plurality of transmission antennas; and a transmission waveform shaper to perform carrier modulation with respect to signals output from the linear precoder, wherein the plurality of reception apparatus include:
- at least one first reception apparatus, to which the transmission signals are transmitted; and
- second reception apparatus, which are reception apparatus other than the at least one first reception apparatus, wherein the transmission apparatus includes:
- a non-linear precoder to perform non-linear precoding with respect to the transmission signals so as to remove interference among the at least one first reception apparatus, and
- a receiver that receives a linear precoding matrix from a control station which calculates the linear precoding matrix so that received power in the second reception apparatus among the plurality of reception apparatus is equal to or less than a threshold, wherein the linear precoder multiplies the transmission signals subjected to the non-linear precoding by the non-linear precoder, by the received linear precoding matrix, which is a precoding matrix for making the received power in the second reception apparatus equal to or less than the threshold.

* * * * *